US012319427B2

(12) United States Patent
Zhang et al.

(10) Patent No.: US 12,319,427 B2
(45) Date of Patent: Jun. 3, 2025

(54) SYSTEMS AND METHODS FOR AUTONOMOUS VISION-GUIDED OBJECT COLLECTION FROM WATER SURFACES WITH A CUSTOMIZED MULTIROTOR

(71) Applicant: Arizona Board of Regents on behalf of Arizona State University, Tempe, AZ (US)

(72) Inventors: Wenlong Zhang, Chandler, AZ (US); Shatadal Mishra, Tempe, AZ (US); Danish Faraaz Syed, Tempe, AZ (US); Michael Ploughe, Tempe, AZ (US)

(73) Assignees: Arizona Board of Regents on behalf of Arizona State University, Tempe, AZ (US); Salt River Project, Tempe, AZ (US)

( * ) Notice: Subject to any disclaimer, the term of this patent is extended or adjusted under 35 U.S.C. 154(b) by 492 days.

(21) Appl. No.: 17/728,137

(22) Filed: Apr. 25, 2022

(65) Prior Publication Data
US 2022/0355926 A1 Nov. 10, 2022

Related U.S. Application Data

(60) Provisional application No. 63/178,645, filed on Apr. 23, 2021.

(51) Int. Cl.
*B64D 35/00* (2006.01)
*B64C 25/54* (2006.01)
(Continued)

(52) U.S. Cl.
CPC .............. *B64D 35/00* (2013.01); *B64C 25/54* (2013.01); *B64D 1/22* (2013.01); *B64U 10/14* (2023.01);
(Continued)

(58) Field of Classification Search
CPC .......... B64D 35/00; B64D 1/22; B64C 25/54; B64U 10/14; B64U 30/24; B64U 60/10;
(Continued)

(56) References Cited

U.S. PATENT DOCUMENTS

| 4,447,083 A | * | 5/1984 | Campana | ................. B64D 1/22 |
| | | | | 294/66.1 |
| 5,086,998 A | * | 2/1992 | Pelas | ....................... B64D 1/22 |
| | | | | 441/83 |

(Continued)

FOREIGN PATENT DOCUMENTS

| CN | 111284691 A | * | 6/2020 | ............. B64C 39/02 |
| CN | 112644699 A | * | 4/2021 | |

OTHER PUBLICATIONS

Machine Translation: CN-112644699-A (Year: 2021).*
(Continued)

*Primary Examiner* — Aaron L Troost
*Assistant Examiner* — Connor L Knight
(74) *Attorney, Agent, or Firm* — Polsinelli PC

(57) ABSTRACT

Various embodiments of a vision-guided unmanned aerial vehicle (UAV) system to identify and collect foreign objects from the surface of a body of water are disclosed herein. A vision system and methodology has been developed to reduce reflections and glare from a water surface to better identify an object for removal. A linearized polarization filter and a specularity-removal algorithm is used to eliminate excessive reflection and glare. A contour-based detection algorithm is implemented for detecting the targeted objects on water surface. Further, the system includes a boundary layer sliding mode control (BLSMC) methodology to reduce and minimize position and velocity errors (Continued)

between the UAV and object in the presence of modeling and parameter uncertainties due to variation in a moving water surface.

15 Claims, 15 Drawing Sheets

(51) Int. Cl.

| | | |
|---|---|---|
| B64C 39/02 | (2023.01) | |
| B64D 1/22 | (2006.01) | |
| B64U 10/14 | (2023.01) | |
| B64U 30/24 | (2023.01) | |
| B64U 60/10 | (2023.01) | |
| G05D 1/00 | (2024.01) | |
| G05D 1/10 | (2006.01) | |
| G06T 5/00 | (2024.01) | |
| G06T 7/246 | (2017.01) | |
| G06T 7/73 | (2017.01) | |
| G08G 5/00 | (2025.01) | |
| G08G 5/55 | (2025.01) | |
| G08G 5/57 | (2025.01) | |
| G08G 5/72 | (2025.01) | |
| B64U 101/00 | (2023.01) | |
| B64U 101/30 | (2023.01) | |

(52) U.S. Cl.
CPC ............ *B64U 30/24* (2023.01); *B64U 60/10* (2023.01); *G05D 1/0088* (2013.01); *G05D 1/0094* (2013.01); *G05D 1/106* (2019.05); *G06T 5/00* (2013.01); *G06T 7/248* (2017.01); *G06T 7/73* (2017.01); *G08G 5/55* (2025.01); *G08G 5/57* (2025.01); *G08G 5/723* (2025.01); *B64U 2101/00* (2023.01); *B64U 2101/30* (2023.01); *B64U 2201/10* (2023.01); *G06T 2207/10016* (2013.01); *G06T 2207/10032* (2013.01)

(58) Field of Classification Search
CPC ............ B64U 2101/00; B64U 2101/30; B64U 2201/10; B64U 2201/20; B64U 70/30; B64U 2201/00; B64U 2101/16; B64U 2101/64; B64U 10/13; B64U 70/90; B64U 30/20; B64U 50/14; B64U 70/97; B64U 2101/32; B64U 2101/60; B64U 60/50; B64U 80/25; B64U 10/10; B64U 10/25; B64U 20/20; B64U 20/30; B64U 30/10; B64U 30/40; B64U 70/70; B64U 80/70; B64U 80/82; B64U 10/30; B64U 2101/05; B64U 2101/24; B64U 50/19; B64U 70/00; B64U 70/83; B64U 80/86; B64U 2101/31; B64U 2101/20; B64U 10/50; B64U 20/87; B64U 2101/67; B64U 70/20; B64U 10/16; B64U 10/60; B64U 2101/58; B64U 2101/69; B64U 2101/70; B64U 2201/102; B64U 2201/202; B64U 30/26; B64U 30/297; B64U 50/18; B64U 50/34; B64U 50/37; B64U 50/39; B64U 70/92; G05D 1/0088; G05D 1/0094; G05D 1/106; G06T 5/00; G06T 7/248; G06T 7/73; G06T 2207/10016; G06T 2207/10032; G08G 5/0069; G08G 5/0078

See application file for complete search history.

(56) References Cited

U.S. PATENT DOCUMENTS

| | | | |
|---|---|---|---|
| 2009/0060275 A1* | 3/2009 | Hamada | G06T 7/254 |
| | | | 382/103 |
| 2017/0197714 A1* | 7/2017 | Golden | B64U 10/13 |
| 2018/0082428 A1* | 3/2018 | Leung | G06V 10/25 |
| 2019/0212742 A1* | 7/2019 | Qian | G06V 20/17 |
| 2019/0340768 A1* | 11/2019 | Hanks | H02J 50/10 |
| 2020/0031438 A1* | 1/2020 | Moses | G01S 5/0231 |
| 2020/0074673 A1* | 3/2020 | Gupta | G06F 18/214 |
| 2020/0183429 A1* | 6/2020 | Ottenheimer | G05D 1/104 |
| 2021/0197970 A1* | 7/2021 | Azeredo | B66C 1/40 |
| 2022/0011785 A1* | 1/2022 | Mei | G08G 5/0069 |

OTHER PUBLICATIONS

Machine Translation: CN-111284691-A (Year: 2020).*
Chen et al., "A Moving Target Tracking Control and Obstacle Avoidance of Quadrotor UAV based on Sliding Mode Control Using Artificial Potential Field and RBF Neural Networks", 2020, School of Electronics and Information, Jiangsu Universtiy of Science and Technology, pp. 1-6 (Year: 2020).*
R. Meshcheryakov, P. Trefilov, A. Chekhov, S. Diane, K. Rusakov, E. Lesiv, M. Kolodochka, K. Shchukin, A. Novoselskiy, and E. Gon-charova, "An application of swarm of quadcopters for searching opera-tions," IFAC-PapersOnLine, vol. 52, No. 25, pp. 14-18, 2019.
C. Cai, B. Carter, M. Srivastava, J. Tsung, J. Vahedi-Faridi, and C. Wiley, "Designing a radiation sensing uav system," in 2016 IEEE Systems and Information Engineering Design Symposium (SLEDS). IEEE, 2016, pp. 165-169.
J. A. Guerrero and Y. Bestaoui, "Uav path planning for structure inspection in windy environments," Journal of Intelligent & Robotic Systems, vol. 69, No. 1-4, pp. 297-311, 2013.
G. Heredia, A. E. Jimenez-Cano, I. Sanchez, D. Llorente, V. Vega, J. Braga, J. A. Acosta, and A. Ollero, "Control of a multirotor outdoor aerial manipulator," in 2014 IEEE/RSJ International Conference on Intelligent Robots and Systems, 2014, pp. 3417-3422.
P. E. I. Pounds, D. R. Bersak, and A. M. Dollar, "Grasping from the air: Hovering capture and load stability." in ICRA. IEEE, 2011, pp. 2491-2498.
S. Mishra, D. Yang, C. Thalman, P. Polygerinos, and W. Zhang, "Design and control of a hexacopter with soft grasper for autonomous object detection and grasping," in Dynamic Systems and Control Conference, vol. 51913. American Society of Mechanical Engineers, 2018, p. V003T36A003. 2018.
N. Zhao, Y. Luo, H. Deng, Y. Shen, and H. Xu, "The deformable quad-rotor enabled and wasp-pedal-carrying inspired aerial gripper," in 2018 IEEE/RSJ International Conference on Intelligent Robots and Systems (IROS), 2018, pp. 1-9.
S.-J. Kim, D.-Y. Lee, G.-P. Jung, and K.-J. Cho, "An origami-inspired, self-locking robotic arm that can be folded flat," Science Robotics, vol. 3, No. 16, 2018. [Online]. Available: https://robotics.sciencemag.org/content/3/16/eaar2915.
D. Falanga, A. Zanchettin, A. Simovic, J. Delmerico, and D. Scara-muzza, "Vision-based autonomous quadrotor landing on a moving platform," in 2017 IEEE International Symposium on Safety, Security and Rescue Robotics (SSRR). IEEE, 2017, pp. 200-207.
H. Lee, S. Jung, and D. H. Shim, "Vision-based uav landing on the moving vehicle," in 2016 International conference on unmanned aircraft systems (ICUAS). IEEE, 2016, pp. 1-7.
D. Tzoumanikas, W. Li, M. Grimm, K. Zhang, M. Kovac, and S. Leutenegger, "Fully autonomous micro air vehicle flight and landing on a moving target using visual-inertial estimation and model-predictive control," Journal of Field Robotics, vol. 36, No. 1, pp. 49-77, 2019.
J. Thomas, J. Welde, G. Loianno, K. Daniilidis, and V. Kumar, "Autonomous flight for detection, localization, and tracking of moving targets with a small quadrotor," IEEE Robotics and Automation Letters, vol. 2, No. 3, pp. 1762-1769, 2017.

(56) References Cited

OTHER PUBLICATIONS

O. Araar, N. Aouf, and I. Vitanov, "Vision based autonomous landing of multirotor uav on moving platform," Journal of Intelligent & Robotic Systems, vol. 85, No. 2, pp. 369-384, 2017.
P. Vlantis, P. Marantos, C. P. Bechlioulis, and K. J. Kyriakopoulos, "Quadrotor landing on an inclined platform of a moving ground vehicle," in 2015 IEEE International Conference on Robotics and Automation (ICRA). IEEE, 2015, pp. 2202-2207.
D. Zheng, H. Wang, J. Wang, S. Chen, W. Chen, and X. Liang, "Image-based visual servoing of a quadrotor using virtual camera approach," IEEE/ASME Transactions on Mechatronics, vol. 22, No. 2, pp. 972-982, 2017.
P. Kaewtrakulpong and R. Bowden, "An improved adaptive background mixture model for realtime tracking with shadow detection," 2001.
A. B. Godbehere, A. Matsukawa, and K. Goldberg, "Visual tracking of human visitors under variable-lighting conditions for a responsive audio art installation," in 2012 American Control Conference (ACC), 2012, pp. 4305-4312.
A. M. McIvor, "Background subtraction techniques," Proc. of Image and Vision Computing, vol. 4, pp. 3099-3104, 2000.
F. Menna, E. Nocerino, F. Remondino, M. Dellepiane, M. Callieri, and R. Scopigno, "3d digitization of an heritage masterpiece—a critical analysis on quality assessment." International Archives of the Pho-togrammetry, Remote Sensing & Spatial Information Sciences, vol. 41, 2016.
M. L. Comer and E. J. Delp III, "Morphological operations for color image processing," Journal of electronic imaging, vol. 8, No. 3, pp. 279-289, 1999.
G. Nebehay and R. Pflugfelder, "Clustering of Static-Adaptive correspondences for deformable object tracking," in Computer Vision and Pattern Recognition. IEEE, Jun. 2015.
B. Babenko, M.-H. Yang, and S. Belongie, "Visual tracking with online multiple instance learning," in 2009 IEEE Conference on computer vision and Pattern Recognition. IEEE, 2009, pp. 983-990.
A. Lukezic, T. Vojir, L.-Cehovin Zajc, J. Matas, and M. Kristan, "Discriminative correlation filter with channel and spatial reliability," in Proceedings of the IEEE Conference on Computer Vision and Pattern Recognition, 2017, pp. 6309-6318.
Z. Kalal, K. Mikolajczyk, and J. Matas, "Tracking-learning-detection," IEEE transactions on pattern analysis and machine intelligence, vol. 34, No. 7, pp. 1409-1422, 2011.
A. Godil, R. Bostelman, W. Shackleford, T. Hong, and M. Shneier, "Performance metrics for evaluating object and human detection and tracking systems," No. NIST Interagency/Internal Report (NISTIR)-7972, 2014.
H. Ferreau, C. Kirches, A. Potschka, H. Bock, and M. Diehl, "qpOASES: A parametric active-set algorithm for quadratic programming," Mathe¬matical Programming Computation, vol. 6, No. 4, pp. 327-363, 2014.
B. D. Lucas and T. Kanade, "An iterative image registration technique with an application to stereo vision," in Proceedings of the 7th Interna¬tional Joint Conference on Artificial Intelligence—vol. 2, 1981, p. 674-679.
Shen et al., Simple and efficient method for specularity removal in an image, Applied Optics, May 10, 2009, vol. 48, No. 14. 2009.
Mishra et al., Autonomous Vision-Guided Object Collection From Water Surfaces With a Customized Multirotor, IEEE/ASME Transactions on Mechatronics, vol. 26, No. 4, Aug. 2021.
Lin et al., Microsoft COCO: Common Objects in Context, ECCV 2014, Park V, LNCS 8693, pp. 740-755, 2014.
Lee et al., Geometric Tracking Control of a Quadrotor UAV on SE(3), 49th IEEE Conference on Decision and Control, Dec. 15-17, 2010, 6 pages.

\* cited by examiner

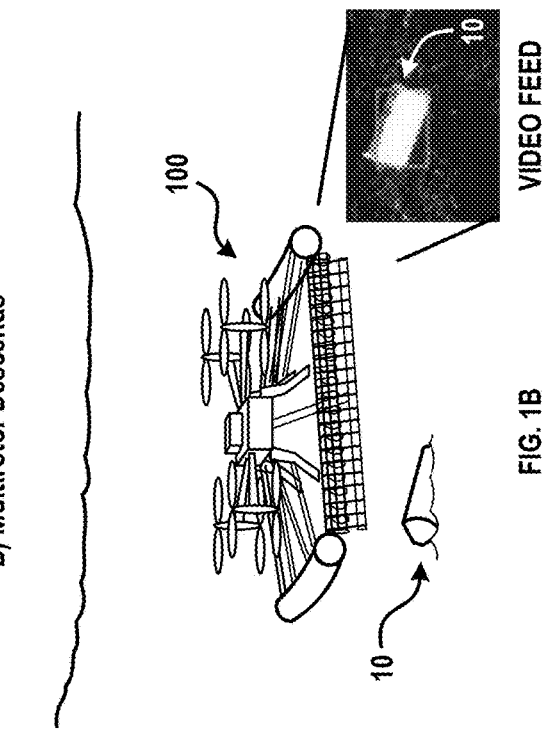
A) Object Detected
FIG. 1A
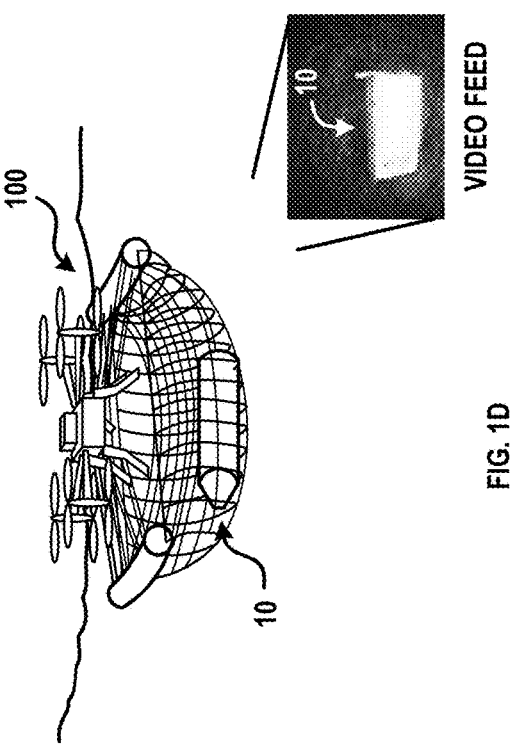
B) Multirotor Descends
FIG. 1B
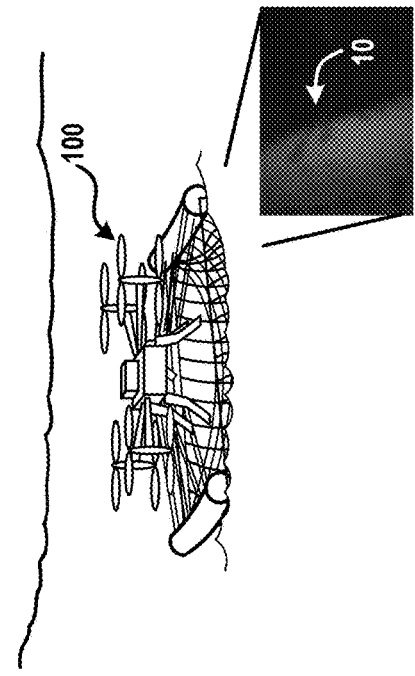
C) Multirotor lands on object
FIG. 1C
D) Multirotor picks up object
FIG. 1D

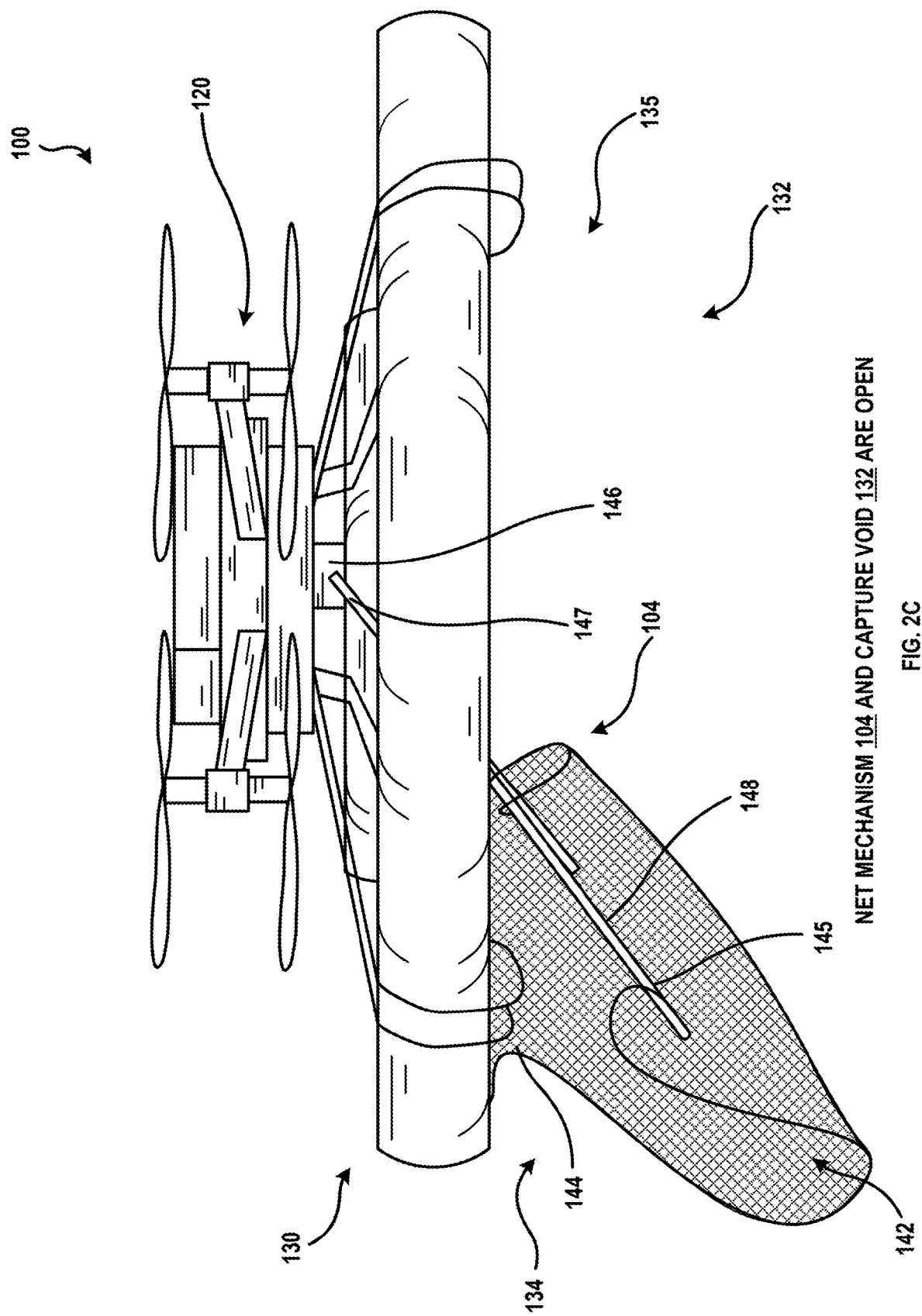

NET MECHANISM 104 AND CAPTURE VOID 132 ARE CLOSED

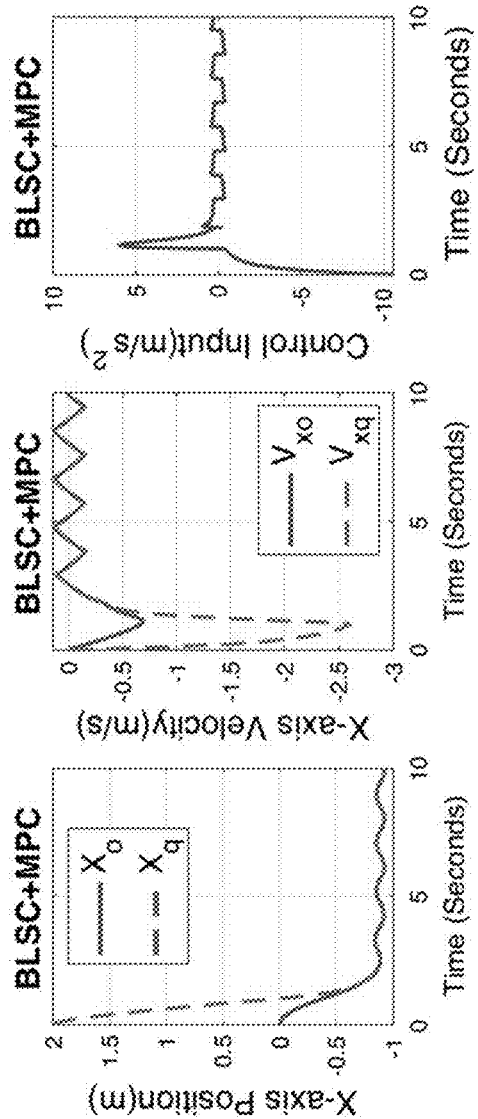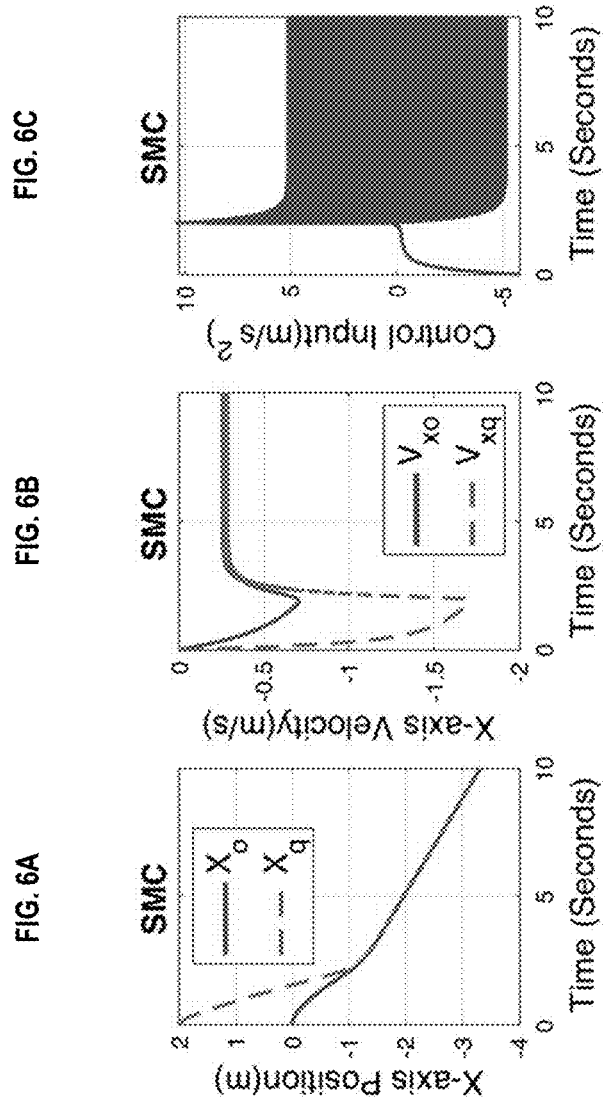

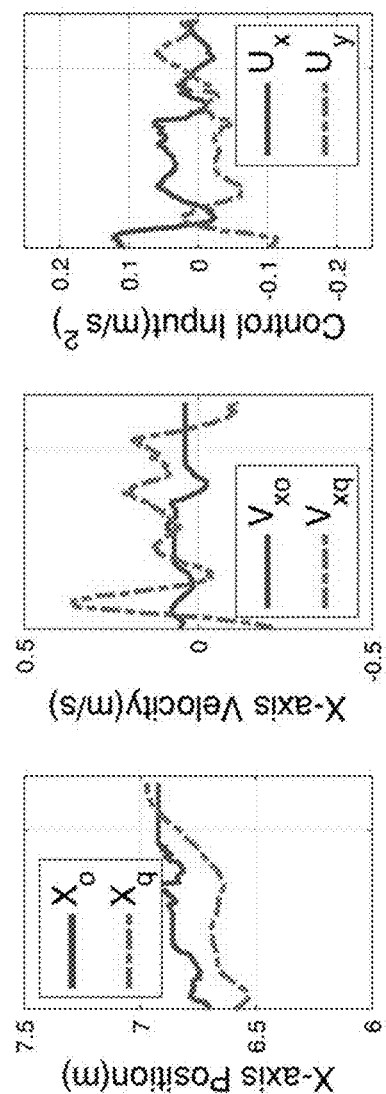
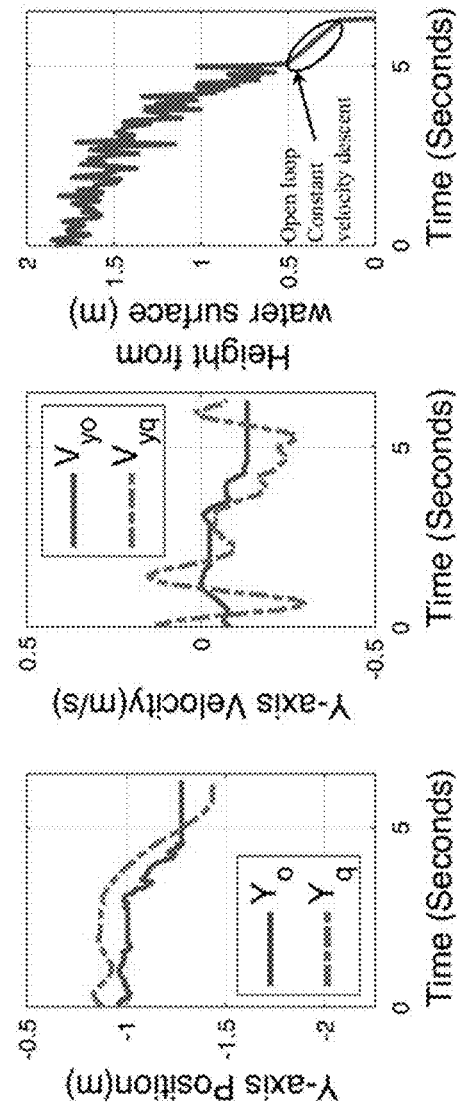
FIG. 7A  FIG. 7B  FIG. 7C  FIG. 7D  FIG. 7E  FIG. 7F

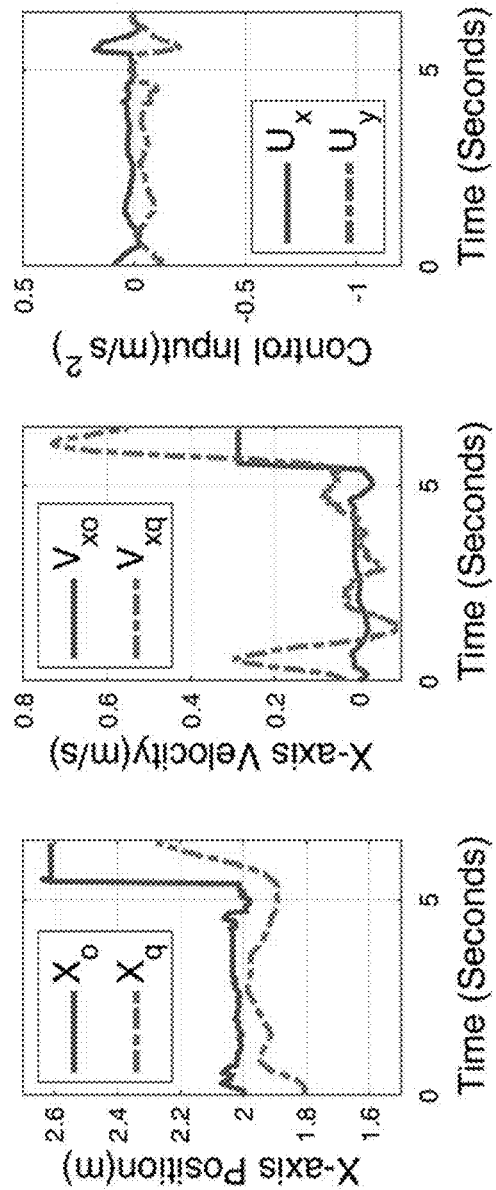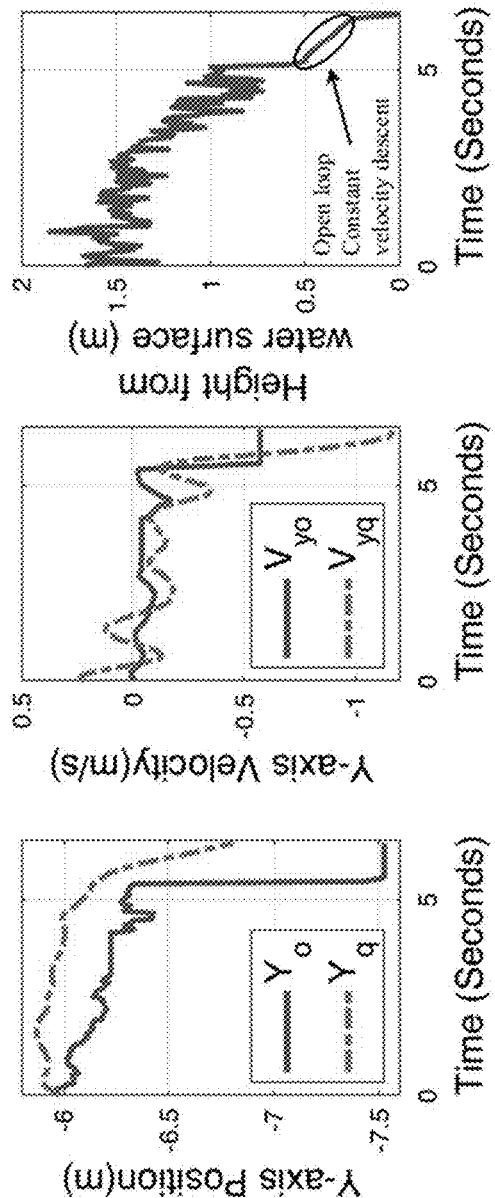

SYSTEMS AND METHODS FOR AUTONOMOUS VISION-GUIDED OBJECT COLLECTION FROM WATER SURFACES WITH A CUSTOMIZED MULTIROTOR

CROSS-REFERENCE TO RELATED APPLICATIONS

This is a non-provisional application that claims benefit to U.S. Provisional Patent Application Ser. No. 63/178,645 filed 23 Apr. 2021, which is herein incorporated by reference in its entirety.

FIELD

The present disclosure generally relates to unmanned aerial vehicles (UAVs), and in particular, to a system and associated method for autonomous vision-guided object collection using a multirotor.

BACKGROUND

The advent of unmanned aerial vehicles (UAVs) has opened up numerous opportunities for executing perilous and mission-critical tasks such as search and rescue, exploration in radioactive and hazardous environments, inspection of vertical structures, and water sample collection. UAVs can fly over dams and canals for water sample collection, inspection and potentially avoid physical labor for these hazardous tasks. For instance, canals in Arizona have played a critical role in irrigation, power generation, and human's daily uses. These canals require frequent monitoring and inspection. Currently, they are dried up periodically for collecting trash items which is a time-consuming and expensive process.

Autonomous object collection from water surfaces using UAVs poses challenges in 1) aerial manipulation and object collection and 2) landing on a moving object. The field of aerial grasping and manipulation has witnessed great progress recently. A multirotor equipped with a 7-degree of freedom (DOF) manipulator was proposed for aerial manipulation tasks. The 7-DOF manipulator is attached with a camera and is shown to track an object. Pounds et al. employed a helicopter for aerial grasping and discussed the effects of ground wash. To ensure repeatable grasping performance, precise motion control would be required to ensure the object lies within the grasper's workspace, especially when the quadrotor is close to the object. Additionally, adding a robotic manipulator would increase the aircraft gross weight (AGW) and reduce the overall flight time and effective payload. In previous work on autonomous aerial grasping, a hexarotor was integrated with a three-finger soft grasper, which was made of silicone with pneumatically-controlled channels. Experimental results demonstrated that off-centered and irregularly-shaped objects were grasped successfully by the soft grasper. In another reference, a deformable quadrotor was proposed where the whole body was deformed to grasp objects. An origami-inspired foldable arm was proposed in one reference which could be utilized for performing different tasks in confined spaces. Although the robotic arm is extremely lightweight, the arm has one degree of freedom and can pick up objects from limited range of directions. Despite considerable work in this field, aerial grasping of objects on water surfaces poses additional challenges such as i) random motion of floating objects due to unpredictable current flow, ii) partially submerged objects.

Considerable research has been conducted for a multirotor to autonomously land on a moving target. In another reference, a minimum-energy based trajectory planning method was proposed to land on a moving target with a constant velocity. Lee et al. proposed a line-of-sight based trajectory tracking control for quadrotor landing on a moving vehicle in outdoor conditions. In this work, the velocity commands were generated based on the relative distance between the current and target position. Multiple outdoor tests were performed in another reference to autonomously land a UAV on a moving target using model predictive control (MPC). In another reference, a small quadrotor was demonstrated to track a moving spherical ball and the quadrotor's planned trajectory was updated using a receding horizon trajectory planner. However, there are several significant differences between landing on a moving target on ground and a floating object on water surface. Generally, moving targets consist of distinctive markers which reduce the complexity of tracking and dynamics of the moving target is deterministic. On the other hand, tracking floating objects on a water surface is challenging due to reflection and glare from water surfaces. Moreover, the motion of a floating object in close proximity to a multirotor's propeller outwash is complex and random. Therefore, a robust control technique is required to handle modeling uncertainties for reliably tracking and landing on the floating object.

It is with these observations in mind, among others, that various aspects of the present disclosure were conceived and developed.

BRIEF DESCRIPTION OF THE DRAWINGS

FIGS. 1A-1D are a series of views showing a multirotor detecting an object, descending above the object, landing on water on the object, and picking up the object;

FIG. 2C is a first side view showing the multirotor of FIG. 1A with a net opened;

FIGS. 6A-6F are a series of views showing a comparison of states for multirotor of FIG. 1A with respect to a control input;

FIGS. 7A-7F are a series of views showing results from a successful flight test of the multirotor of FIG. 1A;

FIGS. 8A-8F are a series of views showing results from a failed flight test of the multirotor of FIG. 1A;

Corresponding reference characters indicate corresponding elements among the view of the drawings. The headings used in the figures do not limit the scope of the claims.

DETAILED DESCRIPTION

Figure 2A:
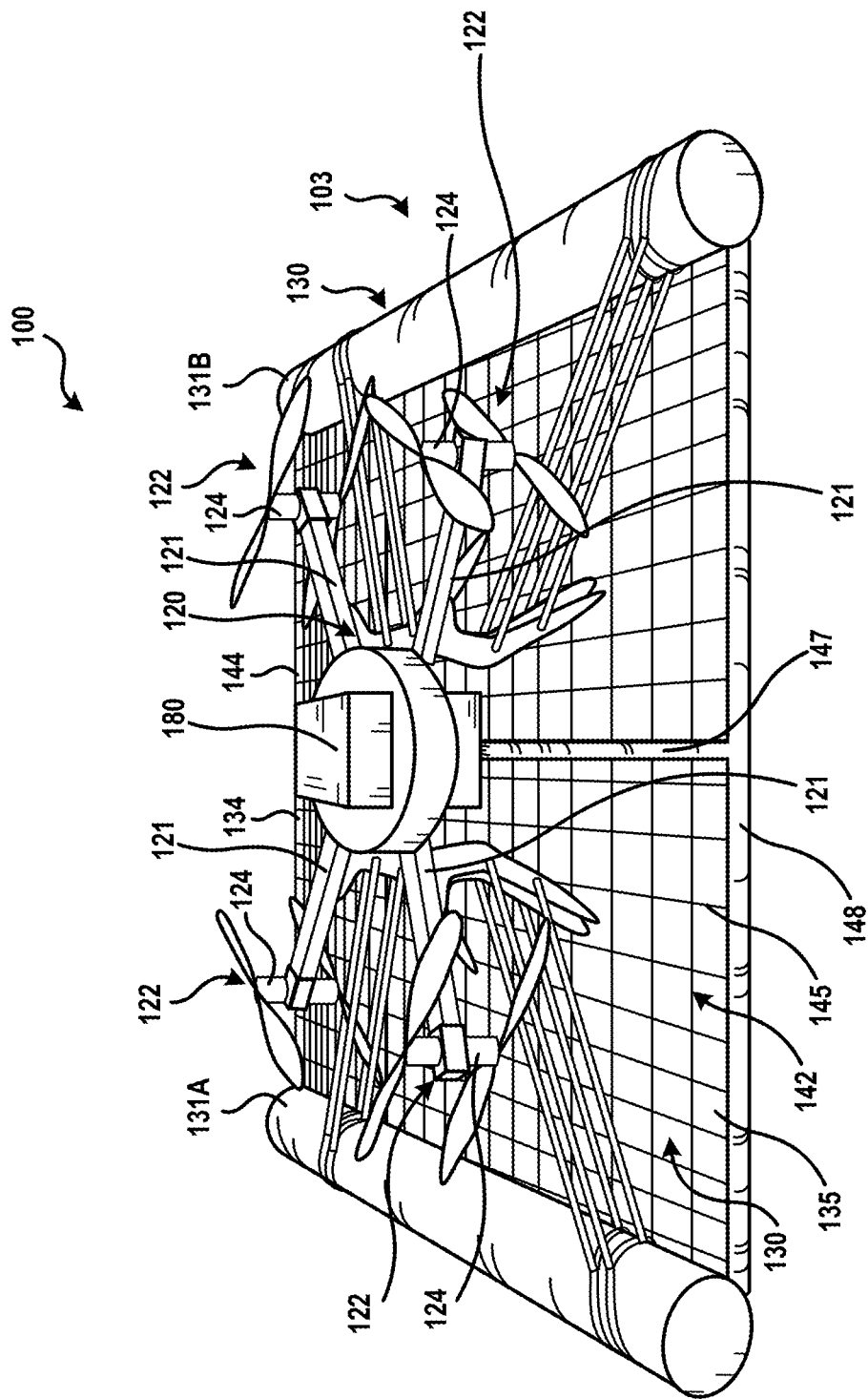
FIG. 2A is an isometric view showing the multirotor of FIG. 1A.

Various embodiments of a system for autonomous detection and collection of objects floating on a water surface are disclosed herein. In particular, autonomous detection and collection is performed by a multirotor that implements a boundary layer sliding mode control (BLSMC) method with a dynamic sliding manifold. The dynamic sliding manifold is designed to eliminate a reaching phase for sliding mode control. The multirotor features a robust vision-based controller in conjunction with an integrated net system. During experimental evaluation, the multirotor collected floating objects of different shapes and sizes with a 91.6% success rate. The main contributions of present disclosure are summarized as follows:

- A net-based multirotor system with flotation is proposed for object collection from water surfaces.
- A computationally efficient contour based algorithm with specularity removal is developed for detecting objects on water surfaces under different illumination conditions. A comparison with different detectors is provided to show the advantages of our algorithm.
- A BLSMC approach, with a dynamic sliding surface, is developed. A constrained MPC is designed for determining the optimal sliding surface and the controller demonstrates reliable object tracking in the presence of modeling uncertainties while enabling the system to collect objects under different weather conditions.

II. Multirotor Setup

Referring to FIGS. 1A-3, components of the system 100 including a multirotor 101 for object detection and collection are described. The system 100 demonstrates complete autonomy by utilizing a plurality of onboard sensors 150 for detection, tracking and collection of floating or partially submerged objects on water surfaces. In some embodiments, the system 100 can also be utilized for submersible deployment and collection.

A. Aerial Platform and Actuation System

In one embodiment, the multirotor 101 includes a base frame 120. In some embodiments, the base frame 120 is a co-axial octorotor frame having an enhanced in-air stability, a compact design, and high thrust-to-weight ratio compared to a conventional quadrotor. The base frame 120 is coupled to a landing assembly 103 as shown in FIGS. 2A-2E. In one embodiment, the multirotor 101 has a flight time of 12 minutes with a 500-gram payload. A capacity of an onboard battery (not shown) is 11,000 mAh. One embodiment of the multirotor 101, excluding the payload, weighs 2,352 grams.

The base frame 120 provides a plurality of arms 121, each respective arm 121 including at least one propeller 122 of a plurality of propellers 122 rotatable by an associated propeller motor 124 of a plurality of propeller motors 124. The plurality of propeller motors 124 are controlled at least in part by a flight controller system 300 that provides an optimal control output to be applied to each respective propeller motor 124 of the plurality of propeller motors 124 based on a detected position of an object 10 and a set of positional and attitudinal properties of the multirotor 101 such that the multirotor 101 captures the object 10 upon landing on a landing surface.

B. Flotation and Integrated Net System

With continued reference to FIGS. 2A-2E, the multirotor 101 is equipped with the landing assembly 103 that includes a landing structure 130 that frames a capture void 132 for collection of an object 10. As shown, the capture void 132 defines a first terminus 134 and a second terminus 135 located opposite from the first terminus 134. In some embodiments, the landing structure 130 includes a buoyant structure, which can include a first buoyant sub-structure 131A and a second buoyant sub-structure 131B to land and float on water. A primary factor while determining the dimensions of the buoyant sub-structures 131A and 131B was a total weight of the vehicle, as the length and radius of the buoyant sub-structures 131A and 131B determine the generated buoyant force. In one embodiment, the buoyant sub-structures 131A and 131B are of a polyethylene material and provide a 41.2 N of buoyant force whereas the weight of the proposed aerial system is 23.07 N. In one embodiment, the landing assembly 103 including buoyant sub-structures 131A and 131B weighs only 120 grams in total. The position of the buoyant sub-structures 131A and 131B are each 40 cm away from the central body to prevent toppling on water surfaces. It should be noted that while the landing structure 130 shown includes two separable buoyant sub-structures 131A and 131B, the landing structure 130 can optionally be circular or square-shaped and can be present along an entire perimeter of the capture void 132.

Figure 2B:
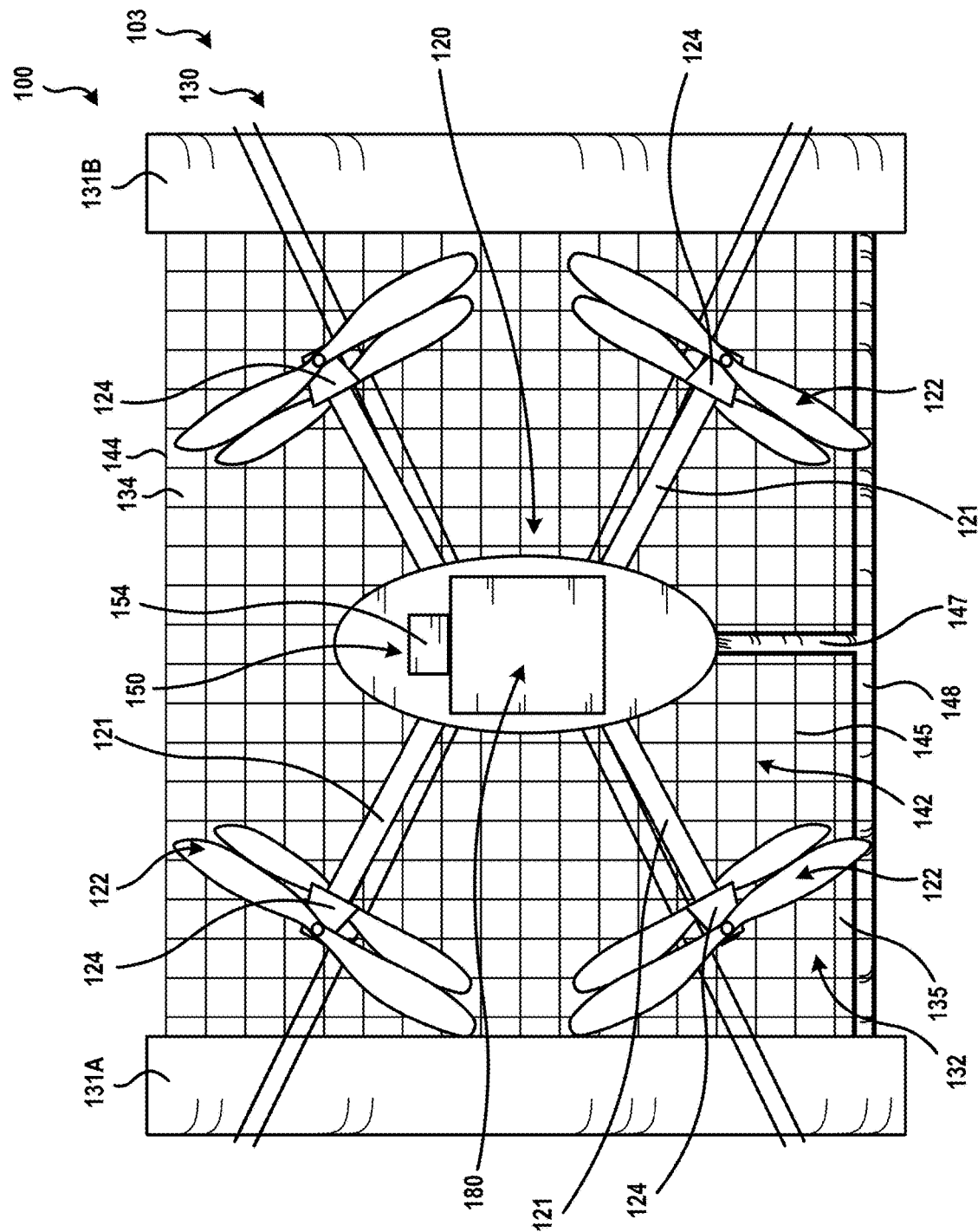
FIG. 2B is a top view showing the multirotor of FIG. 1A.
Figure 2D:
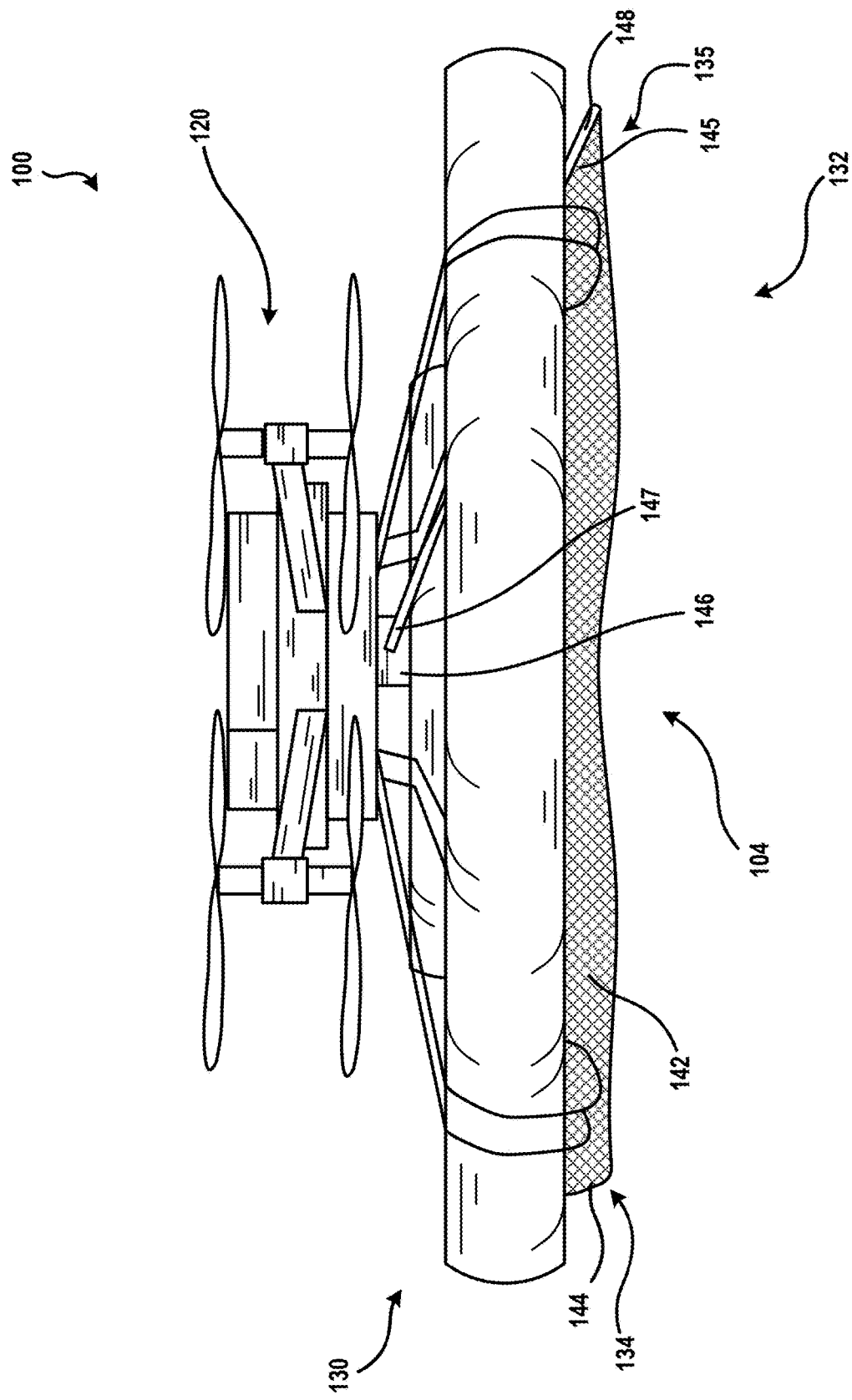
FIG. 2D is a second side view showing the multirotor of FIG. 1A with a net closed.

The multirotor 101 also includes an active net mechanism 104 for collection of the object within the capture void 132, 104 which has a larger workspace compared to a grasper, as shown in FIGS. 2A-2E. The active net mechanism 104 can include a net 142 that defines a first portion 144 and a second portion 145, the first portion 144 being affixed to the landing structure 130 directly at the first terminus 134 of the capture void 132. The second portion 145 of the net 142 is affixed to a moveable rod 148 that is moveable by a servo arm 147. The net 142 can be formed of a durable polypropylene material, as polypropylene is lightweight and provides a large lifting capacity without breaking the net 142. The net mechanism 104 also includes a high-torque servo motor 146 that actuates the servo arm 147, which is attached perpendicularly to the center of the moveable rod 148, as shown. When the servo motor 146 is deactivated, the servo arm 147 and moveable rod 148 push the second portion 145 of the net 142 towards the first portion 144 of the net 142 and the first terminus 134 of the capture void 132 to "open" the net 142 such that the capture void 132 is open, as shown in FIG. 2C. When the servo motor 146 is activated, the servo arm 147 and moveable rod 148 push the second portion 145 of the net 142 towards the second terminus 135 of the capture void 132 to span across the capture void 132 when picking up an object, as shown in FIGS. 2B and 2D. FIGS. 2C and 2D respectively show the net 142 in open and closed positions.

C. Sensor and Computation Subsystem

Figure 2E:
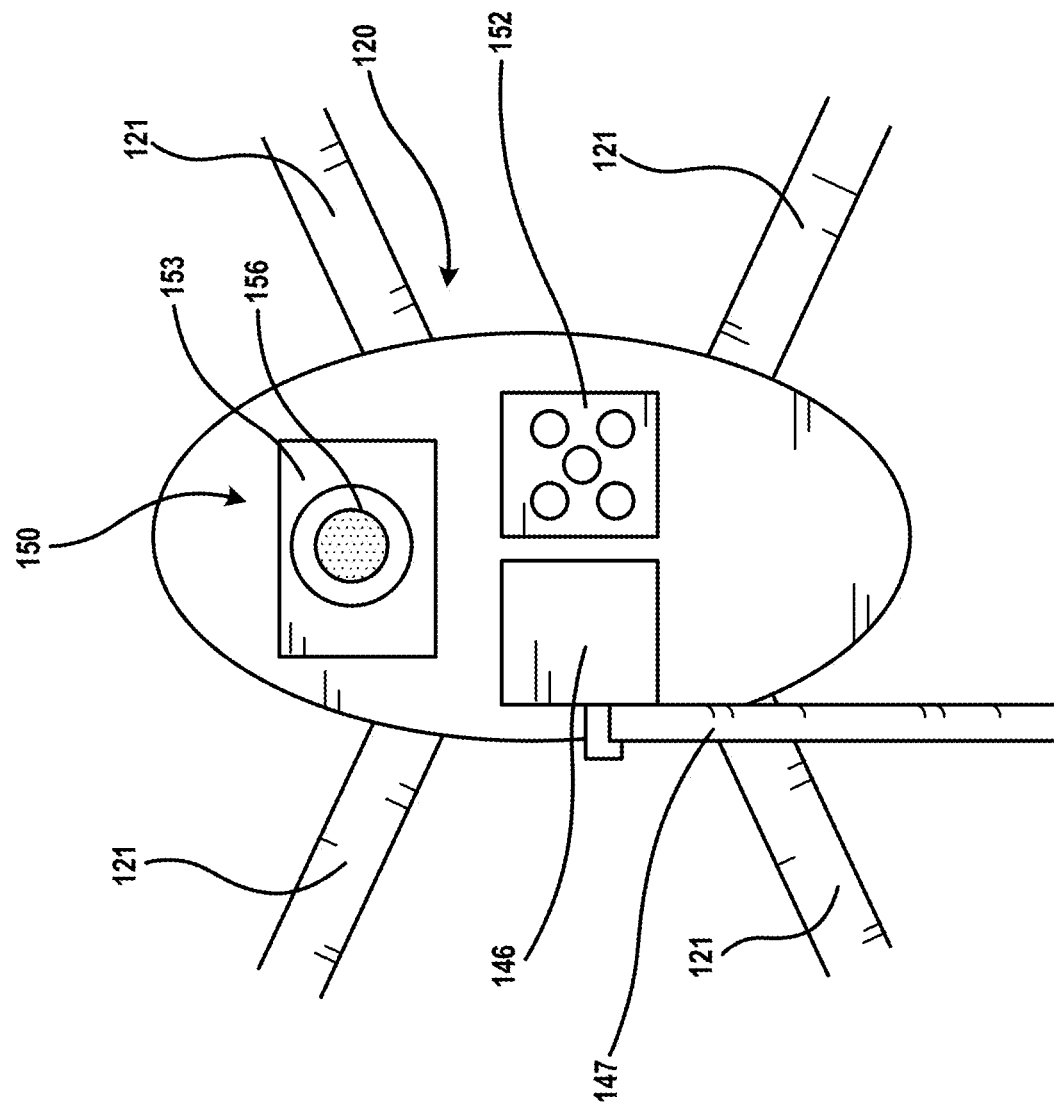
FIG. 2E is an enlarged view showing a plurality of sensors and a servo motor of the multirotor of FIG. 1A.
Figure 3:
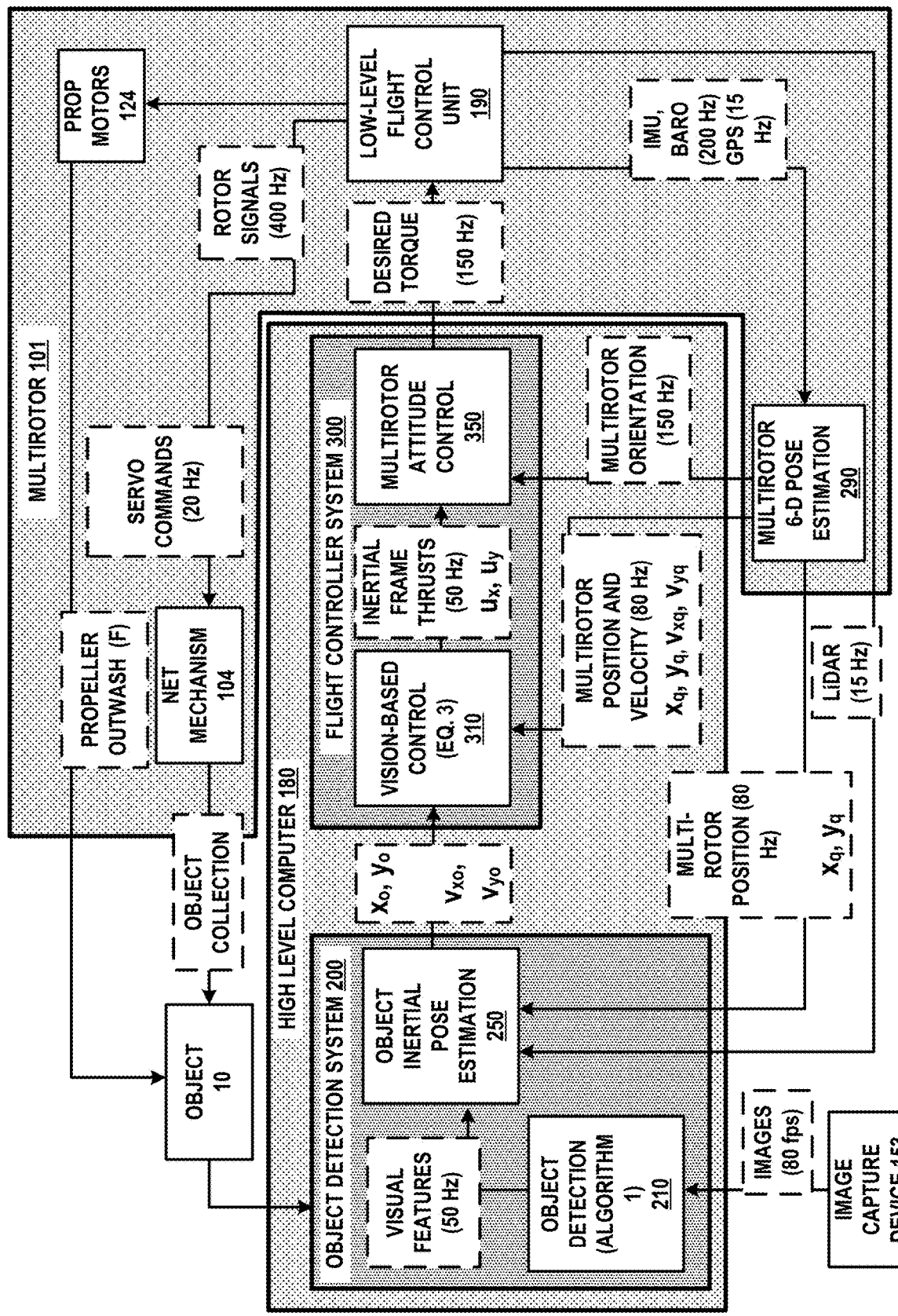
FIG. 3 is a diagram showing a controller of an aerial manipulation system of the multirotor of FIG. 1A.

Referring to FIGS. 2A, 2E and 3, the system 100 is equipped with a plurality of sensors 150 that are collectively operable to estimate a set of positional and attitudinal properties of the multirotor 101, including an inertial measurement unit (IMU) for attitude estimation. Onboard differential pressure sensors and GPS 154 are used for position estimation. A LiDAR 152, which in some embodiments is a single-shot Teraranger Evo (Terabee, France), is located on a bottom of the multirotor 101 and is used for altitude estimation above the water surface for water landing. The multirotor 101 is further equipped with an image capture device 153, which in some embodiments is an oCam-1CGN-U (Withrobot, Rep. of Korea) global shutter monocular camera, for object detection and tracking without motion blur. The image capture device 153 outputs 640×480 images at 80 fps. A low-level flight control unit 190, PIXHAWK, interfaces with sensors through UART and I2C communication and provides signals to each propeller motor 124 and the servo motor 146 based on the desired torques outputted by the flight controller system 300. A high-level computer 180 including a processor 182 in communication with a memory 184 is further included, and in some embodiments is an Intel UpBoard, which interfaces with the image capture device 153 and runs various detection, tracking and vision-based control functions collectively performed by an object detection system 200 and the flight controller system 300 of FIG. 3.

Figure 5:
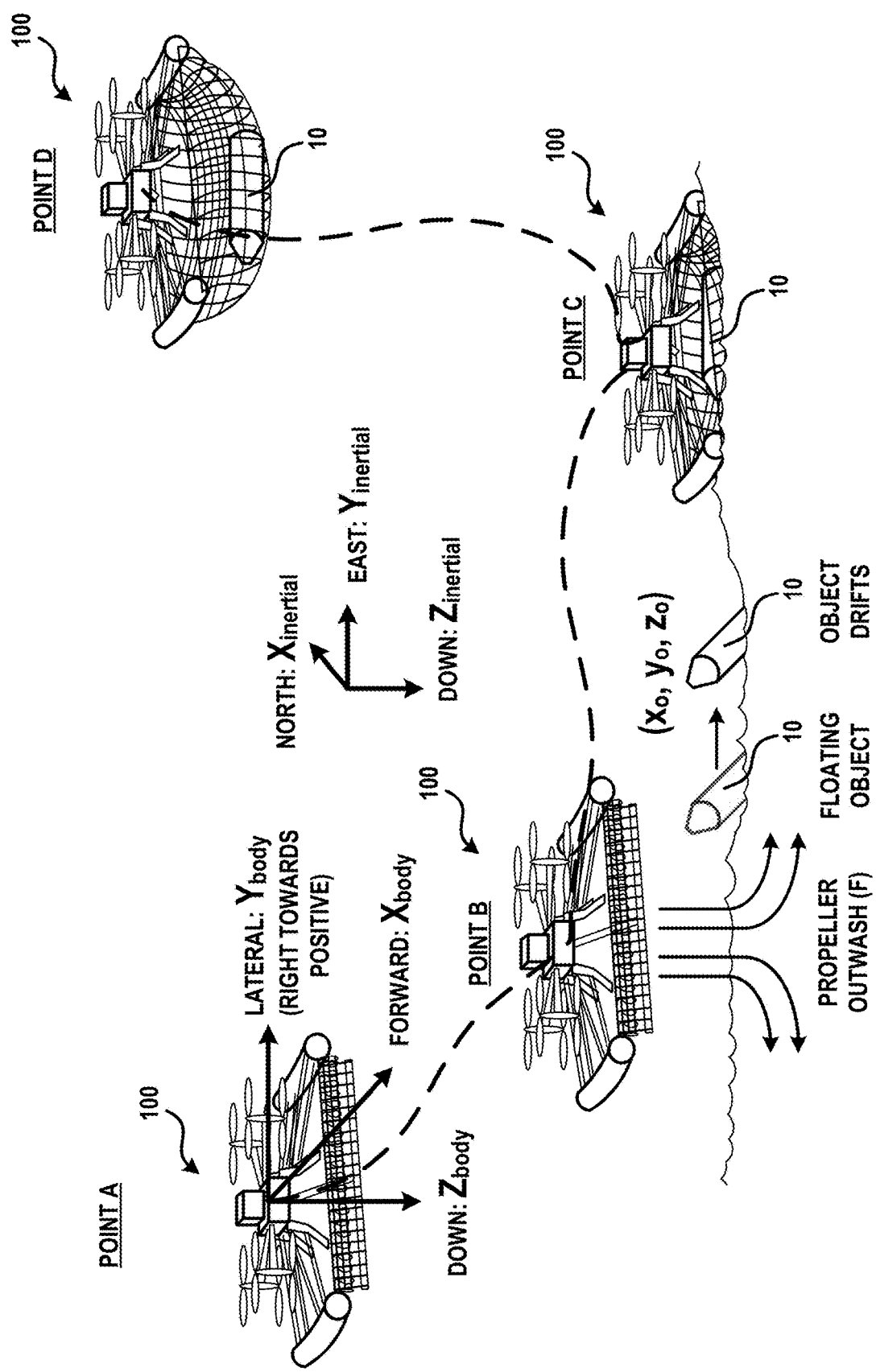
FIG. 5 is an illustration showing an operation principle of an aerial manipulation system of the multirotor of FIG. 1A.
Figure 9A:
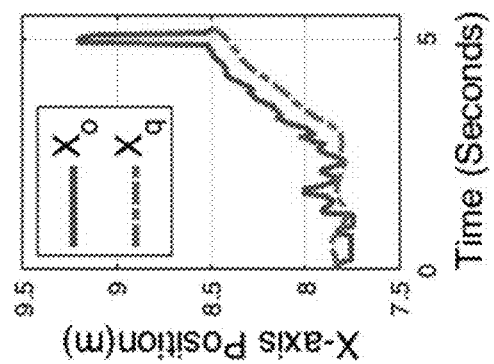
FIGS. 9A-9F are a series of views showing results from a successful flight test of the multirotor of FIG. 1A with a dark shade object on a cloudy day.
Figure 9B:
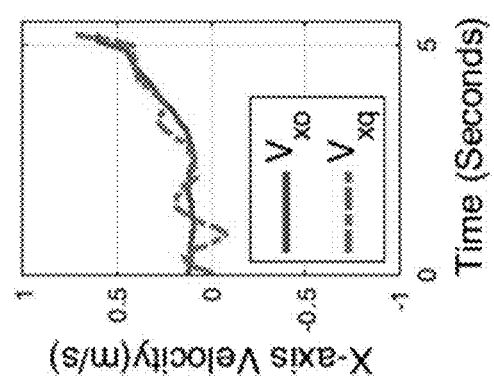
Figure 9C:
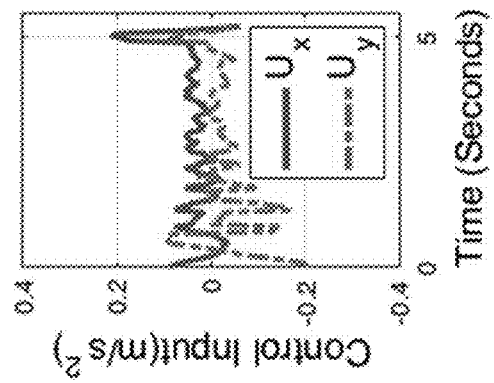
Figure 9D:
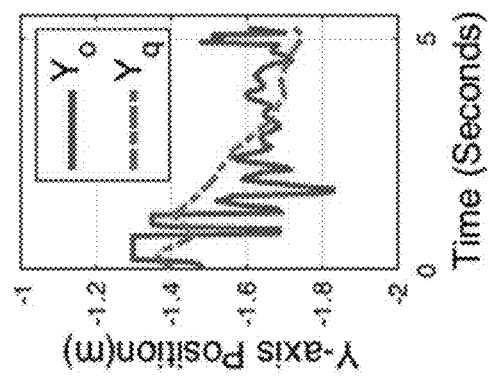
Figure 9E:
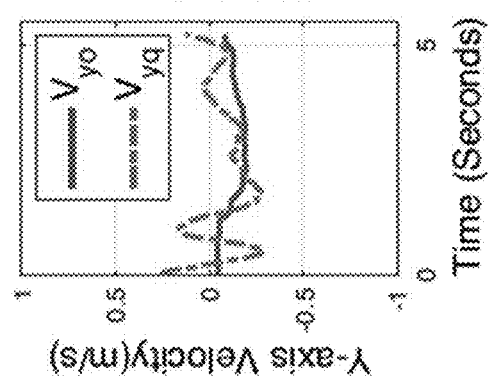
Figure 9F:
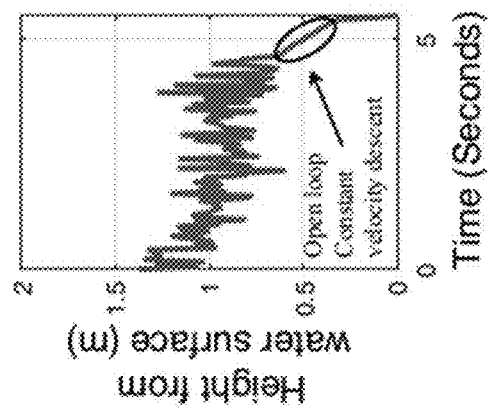
Figure 10A:
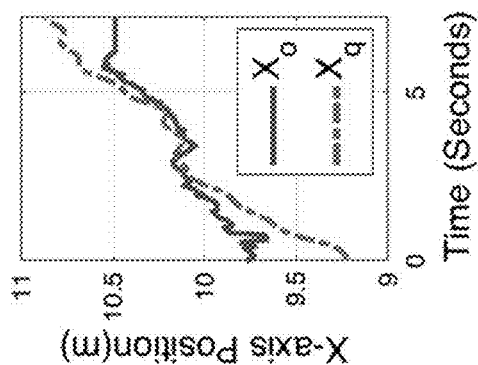
FIGS. 10A-10F are a series of views showing results for state and control trajectories for a conventional system management controller (SMC) of the multirotor of FIG. 1A.
Figure 10B:
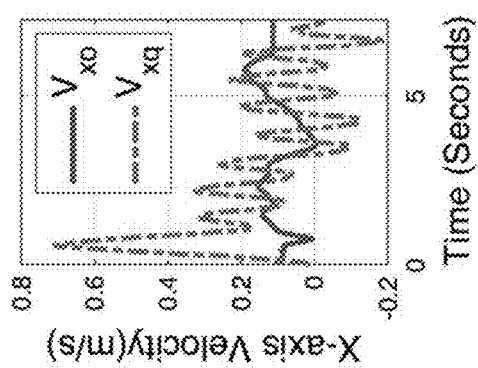
Figure 10C:
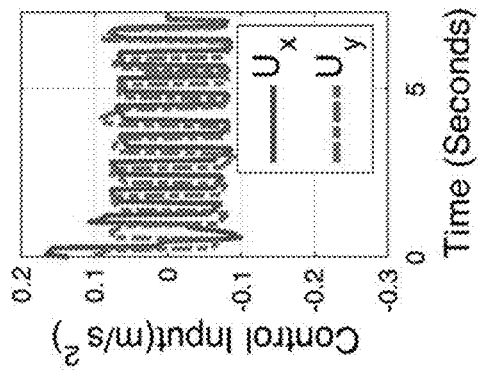
Figure 10D:
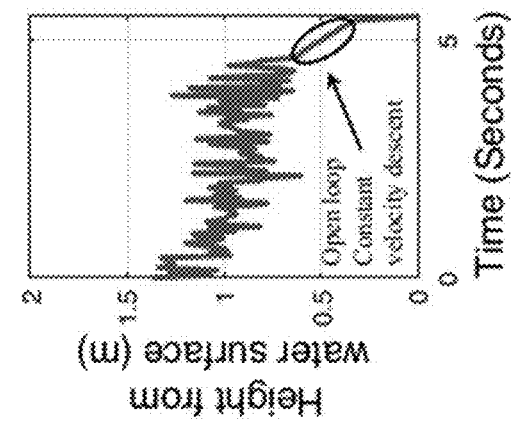
Figure 10E:
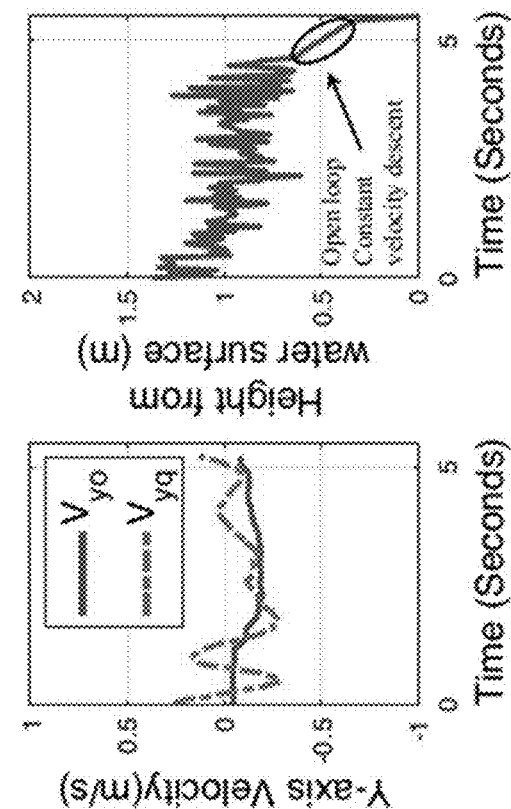
Figure 10F:
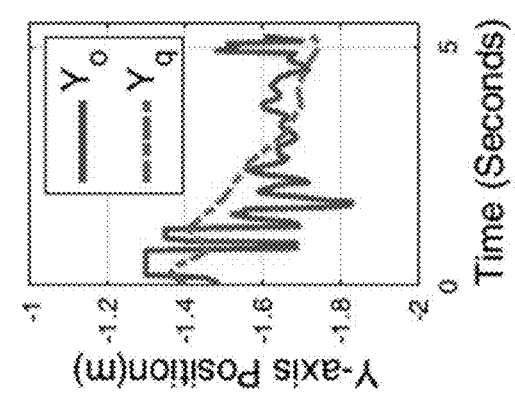

The different software blocks are demonstrated in FIG. 3, including the object detection system 200 that identifies a position of the object 10 within a frame of a video feed captured by image capture device 153 and the flight controller system 300 that provides an optimal control output to be applied to each respective propeller motor 124 of the plurality of propeller motors 124 based on the position of the object 10 and a set of positional and attitudinal properties of the multirotor 101 such that the multirotor 101 encapsulates the object 10 within the capture void 132 upon landing on a landing surface (as demonstrated in FIG. 5). Object detection system 200 can include an object detection sub-system 210 that extracts visual features from the video feed images provided by image capture device 153, and an object inertial pose estimation sub-system 250 that estimates a position and velocity of the object 10 relative to the multirotor 101 based on the position of the object 10 as identified within a frame of the video feed. The vision-based control block 310 receives an estimated position and velocity of the object 10 from object inertial pose estimation sub-system 250 and also receives an estimated position and velocity of the multirotor 101 from a multirotor 6-D pose estimation sub-system 290 that interfaces with the plurality of sensors 150. The vision-based control block 310 of flight controller system 300 determines an optimal control output to be applied to each respective propeller motor 124 including inertial frame thrusts. Eventually, the generated inertial frame thrusts are scaled and sent to a multirotor attitude control sub-system 350 of flight controller system 300 that generates desired attitude setpoints and resultant generated torques for application to the propeller motors 124.

The object detection system 200 detects the object 10 which drifts due to the propeller outwash. The position of the object 10 is estimated by object inertial pose estimation sub-system 250 of object detection system 200. The flight controller system 300 implements a controller scheme discussed in section IV. The inertial thrusts obtained at vision-based control block 310 according to Eq. 3 below are sent to the multirotor attitude control sub-system 350 of flight controller system 300 which generates desired attitude setpoints and resultant generated torques. Eventually, the optimal control output including generated torques are applied to each respective propeller motor 124 of the plurality of propeller motors 124 of the multirotor 101 through the low-level flight control unit 190.

III. Object Detection

The goal of the object detection system 200 is to detect objects on water surfaces. Object detection system 200 uses a combination of a linear polarization filter 156 in front of a lens of the image capture device 153 and a reflection removal methodology to suppress reflections and employ an edge detector followed by contour extraction for detection.

A. Challenges

Detection and tracking of objects on water surfaces pose a multitude of challenges. A major issue with outdoor testing in sunny environments is the glare and reflection of light from the water surfaces and objects. Some of these reflections are intense enough to completely overwhelm the object in the scene. An initial approach was to remove these reflections using background subtraction techniques such as the Gaussian Mixture model or per-pixel Bayesian Mixture Model. However, these algorithms assume still backgrounds and are ineffective when applied to backgrounds that are in motion. Another challenge is the change in the aspect ratio of the object as the multirotor lands on it. This called for the need of the object detection system 200 that is not affected by scale changes. Changing illumination conditions and partial occlusion of the bottle due to drift pose additional challenges.

B. Strategy

The object detection system 200 is represented in FIGS. 4A-4D and the pseudo-code is given by Algorithm 1:

Algorithm 1
Object detection algorithm

```
1:  while read polarized camera frame do
2:    if Object detected = = false then
3:      f ← getframe
4:      Canny_edge_detector(f)
5:      contours(i) = FindContours(f)
6:      Obj = max _area{contours(i)}
7:      if No contour jumps in a window of 10 frames then
8:        Object detected ← true
9:      else
10:       Object detected ← false
11:     end if
12:   end if
13:   if Object detected = = true then
14:     f ← getframe
15:     I_min(p) = min{f_R(p), f_G(p), f_B(p)}
16:     T = μ_v + η * σ_v
17:     τ(p) = { T,          if I_min(p) > T
              { I_min(p),   otherwise
18:     β̂(p) = { 0,                     p within bouding box
              { I_min(p) - τ(p),       otherwise
19:     f_sf(p) = merge{f_R(p) - β̂(p), f_G(p) - β̂(p), f_B(p) - β̂(p)}
20:     Canny_edge_detector(f_sf)
21:     contours(i) = FindContours(f_fs)
22:     Obj = max_area{contours(i)}
23:     if Object not detected for more than 10 frames then
24:       Object detected ← false
25:     end if
26:   end if
27: end while
```

Figures 4A, 4B, 4C, 4D:
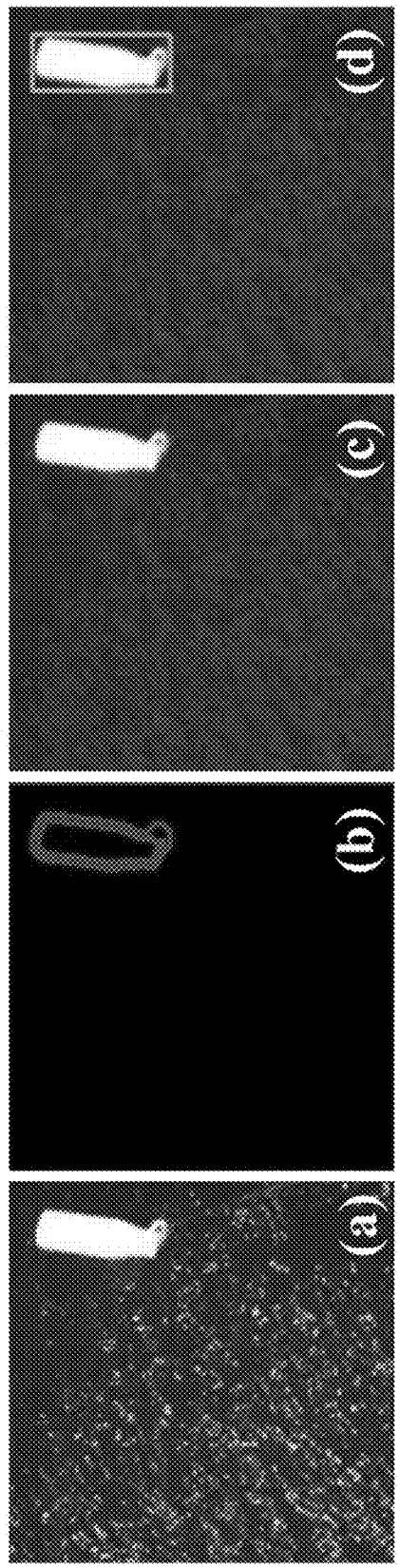
FIGS. 4A-4D are a series of views showing reflection elimination and object detection as performed by the multirotor of FIG. 1A.

In the first phase, a canny edge detector is implemented on polarized video feed to extract a plurality of closed contours from the frame. A contour search method is employed to find the largest closed contour. However, due to the presence of reflections on the water surface, the largest closed contour can either be an object or a reflection. Since the reflections are volatile, their contours aren't consistently placed in the same region. If the largest closed contour is consistently placed in the same region for a minimum threshold quantity of consecutive frames (in some embodiments, the minimum threshold quantity is at least 10 consecutive frames), it indicates the presence of an object in the scene as shown in FIG. 4B. Once the initial closed contour of the object is obtained, current bounding box coordinates indicative of the position of the object are further obtained for the initial closed contour. To ensure reliable object detection, reflections are removed from a subsequent frame by considering the bounding box coordinates of the object in the current frame. By doing this, the object detection system 200 guarantees that the reflection removal algorithm removes specular component of the entire image without affecting the features of the object.

In the second phase, the specularity removal starts by computing the minimum intensity value $I_{min}(p)$ across the RGB channel for each pixel in the frame. An intensity threshold value $T=\mu_v+\eta\cdot\sigma_v$ is then calculated to distinguish highlighted pixels. $\mu_v$ and $\sigma_v$ are the mean and standard deviation of the minimum values $I_{min}$ over all the pixels. $\eta$ is a measure of the specular degree of an image and is generally set to 0.5. Based on the calculated intensity threshold T, an offset $\tau$ is then computed to determine which pixels have to be changed to suppress reflections. The specular component $\hat{\beta}(p)$ of the frame is computed by subtracting the offset from $I_{min}$. For any pixel inside the bounding box, $\hat{\beta}(p)$ is set to 0 to preserve the features of the object to be detected. Finally, the specular component is subtracted from the frame to get the specular-free image without removing reflections from the area where the object is located. One can clearly see the reflections removed without the object being affected by comparing FIGS. 4A and 4C. Since reflections have been eliminated in the rest of the frame, the region where the object lies is highlighted when compared with rest of the image. The contours are extracted again using the canny edge detector and the object is detected as seen in FIG. 4C. The updated bounding box coordinates of the object is utilized for specularity-removal from the next frame, and the process iterates. If no contours are detected for a pre-determined time window, the object detection system 200 reverts back to the maximum-area contour searching.

C. Performance Comparison

The performance comparison was conducted on an Intel Core i7-10750H CPU system with 10 GB RAM and 4 cores. Test videos of 1 minute length each were recorded for five objects at 30 fps, as shown in Table I, in cloudy/partly cloudy conditions with a polarizing filter 156 in front of the lens of the image capture device 153. The gain and exposure values were 15 and 45 respectively. The object detection system 200 was compared with deep-learning based detectors such as YOLOv3 and Mobilenet SSDv2 which were pre-trained on the COCO dataset. The metrics used for the evaluation are the processed frames per second (FPS), CPU usage, precision and recall. The latter two are defined as:

$$\text{Precision} = \frac{TP}{TP+FP}, \text{Recall} = \frac{TP}{TP+FN},$$

where TP, FP, and FN are the numbers of True Positives, False Positives, and False Negatives detected by the tracker, respectively.

For training the deep-learning models, 2000 images were collected and labeled. Since the objective of the object detection system 200 is to detect any object, all the images were labelled under a single class. Synthetic data was generated by performing various operations such as rotation, shearing and varying brightness intensity on the training dataset. The brightness of the images was varied to capture different illumination conditions. The addition of the synthetic data increased the size of the training dataset to 6000 images. Both YOLO and SSD were trained until they reached their average losses stabilized at 0.13 and 3.1 respectively. The models were then deployed on the collected test videos to examine their FPS and CPU usage. The average CPU consumption for the object detection system 200 is 37.5% whereas the average FPS is 21 FPS. The YOLO model utilizes 86.25% of the total CPU and average FPS is 2.8 FPS which is not suitable for realtime testing. SSD had a better average FPS of 11 FPS when compared to YOLO, but it also had a high CPU consumption of 75% that made it unsuitable for our purpose.

The ground truth generation and performance evaluation were conducted in MATLAB. This ground truth was only utilized for calculating precision and recall, and was not used in field experiments. Precision and Recall are equal because the test videos and the ground truth video had an equal number of frames which results to an equal number of true positives and false negatives. The YOLO model has the highest precision and recall for most of the objects. The object detection system 200 shows comparable performance to YOLO. SSD has the lowest precision and recall due to its inability to detect objects for a large number of frames.

IV. System Modeling and Control

The dynamics of the flight controller system 300 with respect to the multirotor 101 and floating object 10 is outlined in this section. The propeller outwash of the multirotor 101 moves the floating object 10 around, and flight controller system 300 is designed for the multirotor 101 to track and land on the object, particularly such that the multirotor 101 encapsulates the object 10 within the capture void 132 upon landing on a landing surface. The flight controller system 300 determines the optimal control output to be applied to each respective propeller motor 124 of the plurality of propeller motors 124 based on the set of positional and attitudinal properties of the multirotor 101, the position of the object 10 and a velocity of the object 10.

A. Multirotor and Object Dynamics

A set of dynamics models of the multirotor 101 and object 10 are studied in detail as reliable 2-D tracking of the object is necessary for successful object collection. The following assumptions were made for dynamic modeling of the multirotor 101 and the object 10:

TABLE 1

Performance comparisons of different trackers.

| Objects | Average FPS | | | Total CPU usage in % | | | Precision & Recall | | |
|---|---|---|---|---|---|---|---|---|---|
| | Ours | YOLO | SSD | Ours | YOLO | SSD | Ours | YOLO | SSD |
| White Bottle | 21 | 2.8 | 11 | 37.5 | 86.25 | 75 | 0.96 | 0.97 | 0.57 |
| Dark carton | 21 | 2.8 | 11 | 37.5 | 86.25 | 75 | 0.91 | 0.96 | 0.52 |
| Dark can | 21 | 2.8 | 11 | 37.5 | 86.25 | 75 | 0.78 | 0.90 | 0.22 |
| Silver can | 21 | 2.8 | 11 | 37.5 | 86.25 | 75 | 0.91 | 0.90 | 0.86 |
| Juice carton | 21 | 2.8 | 11 | 37.5 | 86.25 | 75 | 0.97 | 0.96 | 0.80 |

1) The translational kinematics of the multirotor 101 were simplified by assuming the drag acting on the body is negligible.
2) The pattern of the propeller outwash is radially outwards from the position of the multirotor.
3) Water currents and object's vertical dynamics were negligible.
4) The direction of force due to propeller outwash is along the projection of vector, on the water surface, from the center of the multirotor 101 to that of the object 10 on the water surface. It can be seen in FIG. 5 that the vertical downwash transitions to radial outwash upon interaction with water surface.

As illustrated in FIG. 5, the propeller outwash drifts the object 10 and the force generated due to the airflow governs the dynamics of the object 10. The set of dynamics models describe a relationship between the set of positional and attitudinal properties of the multirotor 101, the position of the object 10 and a velocity of the object 10, including a relationship between one or more airflow forces generated by the plurality of propellers 122 of the multirotor 101 and the position of the object 10 and the velocity of the object 10. In particular, 3-D translational dynamics of the multirotor 101 and the object 10 are given by the following equations:

$$\dot{x}_q = v_{xq}, \dot{y}_q = v_{yq}, \dot{v}_{xq} = u_x, \dot{v}_{yq} = u_y,$$

$$\dot{z}_q = v_{zq}, \dot{v}_{zq} = g - u_z, \dot{x}_o = v_{xo}, \dot{y}_o = v_{yo},$$

$$m_o \dot{v}_{xo} = -b(v_{xo})^2 \text{sgn}(v_{xo}) + F_x, F_x = F \cos\delta,$$

$$m_o \dot{v}_{yo} = -b(v_{yo})^2 \text{sgn}(v_{yo}) + F_y, F_y = F \sin\delta,$$

$$F_x = F_{emp} \cos\delta + \Delta F_x, |\Delta F_x| \le \beta_x, \beta_x \ge 0,$$

$$F_y = F_{emp} \sin\delta + \Delta F_y, |\Delta F_y| \le \beta_y, \beta_y \ge 0,$$

$$F_{emp} = k_1 |v_{air}|^2 \hat{v}_{air}, \delta = \tan^{-1}((y_o - y_q)/(x_o - x_q)) \quad (1)$$

where: g=9.81, $(u_x, u_y) \in \mathbb{R}^2$ is the control input to the system, $(x_q, y_q, z_q) \in \mathbb{R}^3$ is the position of the multirotor 101, $(v_{xq}, v_{yq}, v_{zq}) \in \mathbb{R}^3$ is the velocity of the multirotor 101, $(x_o, y_o, z_o) \in \mathbb{R}^3$ is the position of the object 10, $(v_{xo}, v_{yo}, v_{zo}) \in \mathbb{R}^3$ is the velocity of the object 10, all in the North-East-Down (NED) Frame. The mass of the object 10 is defined as $m_o \in \mathbb{R}$, $F \in \mathbb{R}^2$ is the planar force experienced by the object 10 due to propeller outwash and represents the coupling dynamics between the multirotor 101 and object 10. $k_1 \in \mathbb{R}$ is a coefficient which is dependent on the area of the object 10 and density of surrounding fluid. $F_{emp} \in \mathbb{R}^2$ is the empirical formulation of F. $(\beta_x, \beta_y) \in \mathbb{R}^2$ represent the bounds on modeling uncertainties. The damping coefficient is $b \in \mathbb{R}$ and $v_{air} \in \mathbb{R}^2$ is the airflow velocity surrounding the object due to the propeller outwash.

B. Controller Design

One objective of the flight controller system 300 is to reduce position and velocity errors between the multirotor 101 and object 10 in the presence of modeling and parameter uncertainties. A boundary layer sliding mode control (BLSMC) with Constrained Linear Model Predictive Control (MPC) approach is disclosed herein that determines the optimal control output to be applied to each respective propeller motor 124 of the plurality of propeller motors 124 based on the set of positional and attitudinal properties of the multirotor 101, the position of the object 10, and the velocity of the object 10. The BLSMC strategy makes the flight controller system 300 robust against modeling uncertainties. A dynamic sliding manifold is used to eliminate the reaching phase for BLSMC to ensure robustness from the beginning.

Furthermore, the constrained MPC is designed considering the closed loop error dynamics of the flight controller system 300 and predicts the future position and velocity errors over a prediction horizon and finds an optimal control input to drive the position and velocity errors to zero. For the inertial Z direction, a PD velocity controller is designed to descend with a predefined constant velocity. For the 3-D rotational dynamics of the multirotor 101, an attitude controller is implemented. For object collection, the multirotor 101 has a predefined yaw setpoint as it can collect objects with any heading.

1) Boundary Layer Sliding Mode Control (BLSMC)

A BLSMC approach of the flight controller system 300 is disclosed to alleviate the chattering of control signals that are commonly seen in conventional sliding mode control methods. As the designed control inputs are the target thrusts to be applied to the propeller motors 124 in the inertial X and Y directions, chattering thrust signals are detrimental because they cause a multirotor 101 to constantly roll and pitch back and forth. As a result, the measurements from the image capture device 153 of the position and velocity of the object 10 can be adversely affected. To design BLSMC, dynamic sliding manifolds are defined as the following:

$$s_x = (v_{xo} - v_{xq}) + \lambda_x (x_o - x_q) + \phi_x(t)$$

$$s_y = (v_{yo} - v_{yq}) + \lambda_y (y_o - y_q) + \phi_y(t) \quad (2)$$

It can be noted that $s_x(0)=0$ and $s_y(0)=0$, if $\phi_x(0) = -\dot{e}_x(0) - \lambda e_x(0)$ and $\phi_y(0) = -\dot{e}_y(0) - \lambda e_y(0)$. This eliminates the reaching phase and the sliding mode control system is kept inside the boundary layer from the beginning. Thus, controller functions to keep the sliding mode control system in the boundary layer are designed as:

$$u_x = \frac{-b}{m_o}(v_{xo})^2 \text{sgn}(v_{xo}) + \frac{F_{emp}\cos\theta}{m_o} + \lambda_x(v_{xo} - v_{xq}) + \dot{\phi}_x + (\eta_x + \beta_x) \text{sat}\left(\frac{s_x}{\epsilon_x}\right),$$

$$u_y = \frac{-b}{m_o}(v_{yo})^2 \text{sgn}(v_{yo}) + \frac{F_{emp}\sin\theta}{m_o} + \lambda_y(v_{yo} - v_{yq}) + \dot{\phi}_y + (\eta_y + \beta_y) \text{sat}\left(\frac{s_y}{\epsilon_y}\right)$$

(3)

where sat(·) is the saturation function. The BLSMC is designed with the objective to keep the sliding mode control system in the boundary layer and make it insensitive to modeling and parameter uncertainties. The next objective is to design $\phi_x$ and $\phi_y$ such that the position and velocity errors are regulated to the origin in an optimal manner.

Formulation for $F_{emp}$: $F_{emp}$ is a function of $v_{air}$ which is determined empirically by collecting the windspeed data using an anemometer. The windspeed, due to propeller outwash, is collected at horizontal distances d from the multirotor every 0.5 m until d=3 m. For every distance d, the height of the multirotor h from the surface is also varied from 0.5 m to 2 m. Finally, $v_{air}$ is obtained as a function of d and h. In field experiments, the sum of the first two terms in the controller is constrained within a bound to prevent sudden and aggressive maneuvers.

2) Constrained Linear Model Predictive Control (MPC)

A constrained linear MPC approach is proposed to design $\dot{\phi}_x$ and $\dot{\phi}_y$. For the sake of brevity, only the design of $\dot{\phi}_x$ is shown and $\dot{\phi}_y$ is designed in the same way. Based on the $u_x$ in (3), the closed-loop error ($e_x = x_o - x_q$) dynamics is:

$$\ddot{e}_x = \dot{v}_{xo} - \dot{v}_{xq} = \lambda \dot{e}_x - \dot{\phi}_x - (\eta_x + \beta_s) \text{sat}\left(\frac{s_x}{\epsilon_x}\right) \quad (4)$$

When the sliding mode control system is within the boundary layer, $$sat\left(\frac{s_x}{\epsilon_x}\right) = \frac{s_x}{\epsilon_x}.$$

Then combining (4) and (2) gives:

$$\ddot{e}_x = -\lambda_x \dot{e}_x - \dot{\phi}_x - (\eta_x + \beta_x)\left(\frac{s_x}{\epsilon_x}\right) \quad (5)$$

$$= -\left(\lambda_x + \frac{\zeta_x}{\epsilon_x}\right)\dot{e}_x - \frac{\zeta_x \lambda_x}{\epsilon_x}e_x - \dot{\phi}_x - \frac{\zeta_x}{\epsilon_x}\phi_x$$

where $\zeta_x = \eta_x + \beta_x$. The closed-loop error dynamics then becomes:

$$\begin{bmatrix}\dot{e}_x \\ \ddot{e}_x \\ \dot{\phi}_x\end{bmatrix} = \begin{bmatrix}0 & 1 & 0 \\ \frac{-\zeta_x\lambda_x}{\epsilon_x} & -\lambda_x - \frac{\zeta_x}{\epsilon_x} & \frac{-\zeta_x}{\epsilon_x} \\ 0 & 0 & 0\end{bmatrix}\begin{bmatrix}e_x \\ \dot{e}_x \\ \phi_x\end{bmatrix} + \begin{bmatrix}0 \\ -1 \\ 1\end{bmatrix}w \quad (6)$$

where $w = \dot{\phi}_x$. The continuous-time system is discretized and the cost function for the linear MPC is defined as follows:

$$J = \min_U E_N^T P E_N + \sum_{i=0}^{N-1}\left(E_i^T Q E_i + w_i^T R W_i\right) \quad (7)$$

where $E_i = [e_x(i)\dot{e}_x(i)\ \phi_x(i)]^T$ and N is the prediction horizon. The cost function (7) can be re-written as the following quadratic programming problem:

$$J = \min_U U^T 2(\tilde{R} + \tilde{S}^T \tilde{Q}\tilde{S})U + x^T 2\tilde{T}\tilde{Q}\tilde{S}U, \quad (8)$$

s.t. $U_{min} \leq U \leq U_{max}$

An optimal control sequence, U*, is generated by solving (8) and $w = \dot{\phi}_x = U^*(0)$. The matrices are defined as follows:

$$U = col(w_0, \ldots, w_{N-1}), \tilde{R} = \text{diag}(R, \ldots, R), \quad (8)$$

$$\tilde{Q} = \text{diag}(Q_1, \ldots, Q_{N-1}, P), \tilde{T} = col(A, \ldots, A^N),$$

$$S = \begin{bmatrix} B & 0 & \ldots & 0 & 0 \\ AB & B & \ldots & 0 & 0 \\ \vdots & \vdots & \vdots & \vdots & \vdots \\ A^{N-1}B & A^{N-2}B & \ldots & AB & B \end{bmatrix},$$

$$A = \begin{bmatrix} 1 & dt & 0 \\ \frac{-\zeta_x\lambda_x}{\epsilon_x}dt & -\lambda_x dt - \frac{\zeta_x}{\epsilon_x}dt + 1 & \frac{\zeta_x}{\epsilon_x}dt \\ 0 & 0 & 1 \end{bmatrix}, B = \begin{bmatrix} 0 \\ -dt \\ dt \end{bmatrix}$$

where dt is the sampling time. This constrained MPC was implemented in using the qpOASES libraries.

C. Simulation Results

The performance of the flight controller system 300 is compared with that of a conventional sliding mode controller (SMC) in simulation. Due to space limitation, comparisons are provided only along the x-axis in FIGS. 6A-6F. In this simulation, the following gains were used: $\zeta=5$, $\lambda_x=5$, $\epsilon_x=0.1$, R=0.1, P=250 $I_3$ and N=10. The lower and upper bounds $U_{min}$ and $U_{max}$ are $-10$ ms$^{-2}$ and 10 ms$^{-2}$. The initial positions are $x_q(0)=2$ and $x_o(0)=0$. The initial velocities are zero. It can be noted that the multirotor can track the position and velocity of the object with both approaches. However, for conventional SMC both positions continue to evolve unbounded with time. Whereas, in the proposed approach, both positions are bounded after they converge as shown in the first subplot. This can be attributed to the high terminal weight P, imposed on the terminal state. Moreover, the chattering in the control signal occurs in the SMC control signals, whereas there is no chattering in the control input for the flight controller system 300 using BLSMC+MPC due to the boundary layer implementation.

V. Field Experiments

The efficacy of the present system 100 is validated through a series of field experiments. The experimental setup, results and discussions on the flight tests are presented in this section.

A. Experimental Setup

The outdoor field experiments were conducted in a lake park at Gilbert, Arizona (lat:33.3589, lon:-111.7685). The experiments were conducted during September and October 2020 and the weather conditions were mostly sunny with some clouds in late afternoons. The wind speeds varied between 05 mph with sporadic wind gusts. Additionally, multiple experimental trials were conducted with a dark aluminum can (cylindrical, 200 g) on a cloudy day to demonstrate the system's potential. Due to very limited instances of cloudy days in Arizona, object collection experiments couldn't be conducted with a dark carton (cuboidal, 300 g).

TABLE II

Experimental results for 22 successful trials and 2 failure attempts.

|  | Success | 1$^{st}$ failure | 2$^{nd}$ failure |
|---|---|---|---|
| Final distance (m) | 0.15 ± 0.06 | 0.38 | 0.85 |
| Landing duration (s) | 7.41 ± 1.10 | 7.26 | 6.43 |
| Used capacity (mAh) | 80.50 ± 11.63 | 76.5 | 72 |

B. Experimental Results and Discussion

The aerial manipulation system achieved 22 successful attempts and 2 failed attempts. Due to the unavailability of ground truth data in the outdoor scenario, the error between the final position of the multirotor and object was utilized to analyze the performance of the system. The origin for all the experiments was set when the GPS lock was found. For the sake of brevity, the results of the experimental trials were shown in Table II, including the landing time, battery capacity consumed for performing landing, and norm of error between the final positions of the floating object and multirotor. Due to space constraints, one successful and one failed trials are described thoroughly. $\varsigma_x = \varsigma_y = 2$, $\lambda_x = \lambda_y = 1.0$ and $\eta_x = \eta_y = 0.5$ were used for all the experiments.

The experimental trials demonstrated a high success rate for object collection using the net mechanism 104 and the object detection system 200. Table II shows that the battery capacity consumed during autonomous landing is 80.50 mAh, which is 14% of 575 mAh (the average battery consumption during one trial). The two failed attempts happened in the late afternoon; one with the can and the other with the bottle. One success attempt and one failure attempt are demonstrated in FIGS. 7A-7F and 8A-8F respectively. From FIGS. 7A-7F, it can be noted that the multirotor 101 reliably tracks the position of the object along the X and Y axes. The aerial system starts the descent from a height of 1.8 meters above water surface. The LiDAR is operative above 0.5 meters, so once the multirotor is within 0.5 meters above the water surface, the multirotor 101 is programmed to descend at a constant and low for about 1 second without LiDAR data, after which it drops on the water surface. The rationale behind descending after 0.5 meters is to ensure that the multirotor 101 continues to track the object when it is in proximity to the water surface without causing water splash. Additionally, if the multirotor 101 drops on the object at 0.5 meters, the water splash can be detrimental to the onboard electrical components. In this successful experiment, the total time taken, from object detection to autonomously landing on it, is 6.294 seconds, whereas the average time for the 22 successful trials is 7.41 seconds. FIGS. 8A-8F illustrate one failed attempt. Similar to a successful attempt, the multirotor 101 reliably tracks the position and velocity of the object along X and Y axes until 5.407 seconds. At that time, the multirotor 101 is within 0.5 meters from the water surface. Right at this time, the object goes out of the frame along the multirotor 101 X-axis. As a result, the multirotor 101 pitches forward, in an attempt to track the object, while continuing to descend. Despite the pitching maneuver, the object lands outside the workspace of the net 142 due to erratic motion caused by turbulent water flow. The final distance between the position of the object and multirotor 101 is 0.85 meters which is outside the capture void 132. Furthermore, both failures occurred in the late afternoon when collecting objects with a cylindrical surface, which can be attributed to partial object visibility. Some potential methods to further improve the object collection include usage of a camera on a gimbal to have a flexible field of view as the multirotor 101 gets close to the water surface. Experimental trials were also conducted on a cloudy day with a dark aluminum can. FIGS. 9A-9F demonstrate one successful attempt for dark shade object collection on a cloudy day. The multirotor 101 successfully lands on the object and the final distance between the positions of the object and the multirotor 101 is 0.12 m. For comparison, a standard SMC was implemented and the results were shown in FIGS. 10A-10F. The flight test for standard SMC was conducted with $\varsigma_x = \varsigma_y = 1$, $\lambda_x = \lambda_y = 0.5$ as the flight controller system 300 was extremely aggressive with $\uparrow_x = \varsigma_y = 2$, $\lambda_x = \lambda_y = 1.0$. During this flight test, the final distance between the object and multirotor 101 was 0.39 meters and the object was outside the net's workspace. The failure can be attributed to the jitters in control inputs.

Computing System

Figure 11:
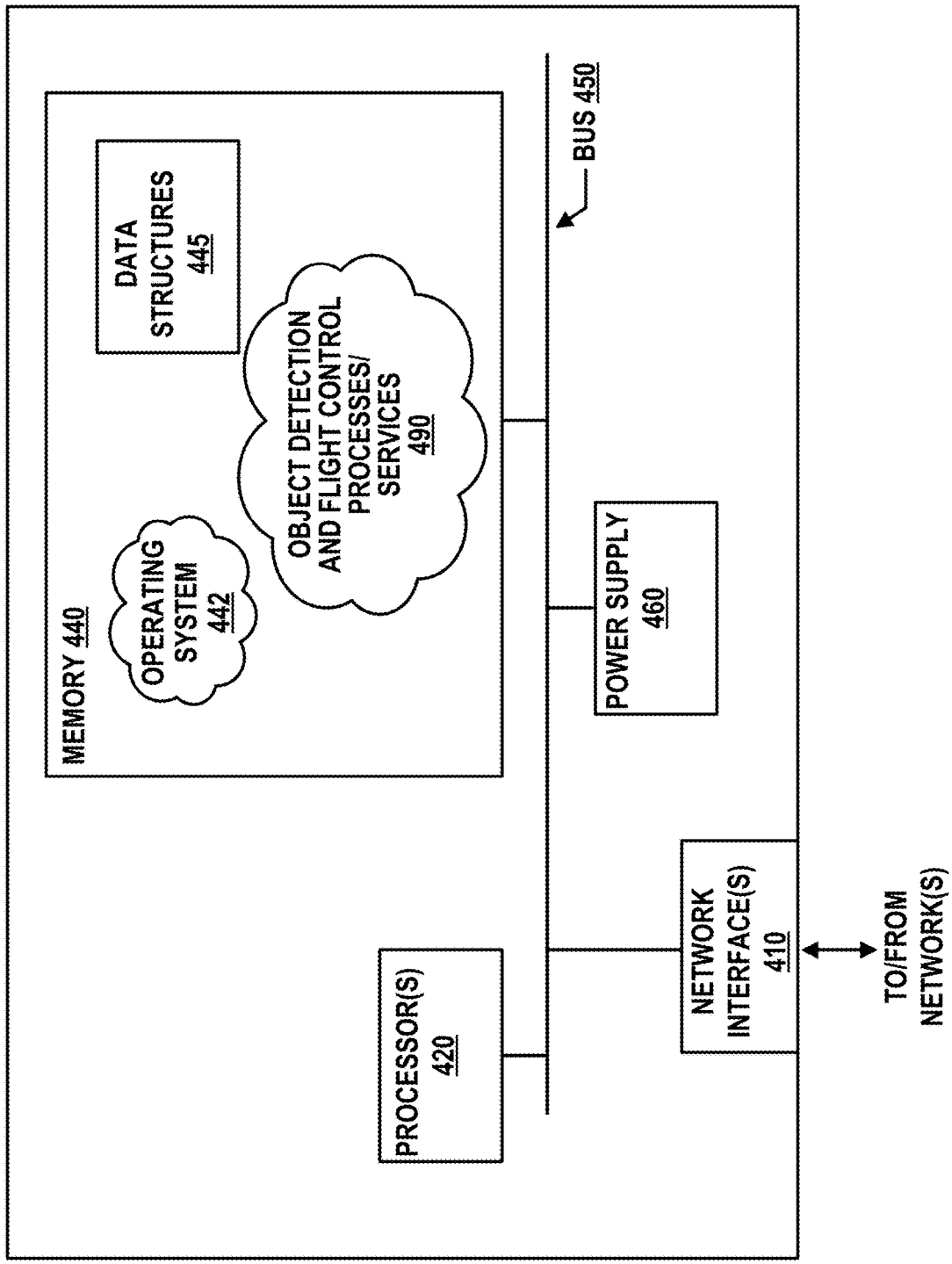
FIG. 11 is a simplified diagram showing an example computing device for implementation of the present system.

FIG. 11 is a schematic block diagram of an example device 400 that may be used with one or more embodiments described herein, e.g., as a component of system 100 and/or as high-level computing device 180 shown in FIGS. 2A, 2B and 3.

Device 400 comprises one or more network interfaces 410 (e.g., wired, wireless, PLC, etc.), at least one processor 420, and a memory 440 interconnected by a system bus 450, as well as a power supply 460 (e.g., battery, plug-in, etc.).

Network interface(s) 410 include the mechanical, electrical, and signaling circuitry for communicating data over the communication links coupled to a communication network. Network interfaces 410 are configured to transmit and/or receive data using a variety of different communication protocols. As illustrated, the box representing network interfaces 410 is shown for simplicity, and it is appreciated that such interfaces may represent different types of network connections such as wireless and wired (physical) connections. Network interfaces 410 are shown separately from power supply 460, however it is appreciated that the interfaces that support PLC protocols may communicate through power supply 460 and/or may be an integral component coupled to power supply 460.

Memory 440 includes a plurality of storage locations that are addressable by processor 420 and network interfaces 410 for storing software programs and data structures associated with the embodiments described herein. In some embodiments, device 400 may have limited memory or no memory (e.g., no memory for storage other than for programs/processes operating on the device and associated caches).

Processor 420 comprises hardware elements or logic adapted to execute the software programs (e.g., instructions) and manipulate data structures 445. An operating system 442, portions of which are typically resident in memory 440 and executed by the processor, functionally organizes device 400 by, inter alia, invoking operations in support of software processes and/or services executing on the device. These software processes and/or services may include Object Detection and Flight Control processes/services 490 described herein with reference to Object Detection System 200 and Flight Controller System 300. Note that while Object Detection and Flight Control processes/services 490 is illustrated in centralized memory 440, alternative embodiments provide for the process to be operated within the network interfaces 410, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the Object Detection and Flight Control processes/services 490 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:
 a multirotor device including:
  a base frame defining a plurality of arms, each arm including at least one propeller of a plurality of propellers rotatable by an associated propeller motor of a plurality of propeller motors;
  a landing assembly located underneath the base frame and including a landing structure framing a capture void, wherein the capture void is configured to encapsulate an object;
  an object detection system including an image capture device operable to capture a plurality of frames;

a flight controller system including a plurality of sensors collectively operable to estimate a set of positional and attitudinal properties of the multirotor device; and a processor in communication with a memory, the image capture device, and the flight controller system, the memory including instructions executable by the processor to:

identify, for a first frame of the plurality of frames, an initial largest closed contour of a plurality of closed contours identifiable within the first frame;

apply a specularity removal operation to pixels within the first frame that are outside of a bounding box associated with the initial largest closed contour;

identify, for the first frame and following specularity removal, a first updated largest closed contour and a first updated bounding box that encloses the first updated largest closed contour, the first updated bounding box being indicative of a position of the object for the first frame;

apply, for a second frame of the plurality of frames, a specularity removal operation to pixels within the second frame that are outside of the first updated bounding box;

identify, for the second frame and following specularity removal, a second updated largest closed contour and a second updated bounding box that encloses the second updated largest closed contour, the second updated bounding box being indicative of a position of the object for the second frame; and apply an optimal control output to the plurality of propeller motors based on one or more positions of the object across the plurality of frames and the set of positional and attitudinal properties of the multirotor device such that the multirotor device encapsulates the object within the capture void upon landing on a landing surface.

2. The system of claim 1, further comprising:

a first terminus of the capture void and a second terminus of the capture void located opposite from the first terminus; and a net mechanism including:
a net defining a first portion and a second portion, wherein the first portion of the net is affixed to the landing structure at the first terminus of the capture void; and
a moveable rod affixed to the second portion of the net and configured for positioning between the first terminus of the capture void and the second terminus of the capture void;
wherein the net spans across the capture void when the moveable rod is positioned at the second terminus of the capture void.

3. The system of claim 2, wherein the moveable rod is moveable by a servo arm operable to actuate the moveable rod between the first terminus of the capture void and the second terminus of the capture void.

4. The system of claim 1, wherein the flight controller system incorporates a set of dynamics models that describe a relationship between the set of positional and attitudinal properties of the multirotor device, the position of the object and a velocity of the object.

5. The system of claim 4, wherein the set of dynamics models includes a model descriptive of a relationship between one or more airflow forces generated by the plurality of propellers of the multirotor device and the position of the object and the velocity of the object.

6. The system of claim 1, wherein the flight controller system employs a sliding mode control system to determine the optimal control output based on the set of positional and attitudinal properties of the multirotor device, the position of the object and a velocity of the object, the sliding mode control system including a dynamic sliding manifold operation based on constrained linear model predictive control that minimizes a position error between the position of the object and a position of the multirotor device and minimizes a velocity error between the velocity of the object and a velocity of the multirotor device and keeps the sliding mode control system within a boundary layer of the sliding mode control system.

7. The system of claim 1, wherein the memory further includes instructions, which, when executed, cause the processor to:

determine a minimum intensity value of a plurality of minimum intensity values for each pixel within the first frame;

determine an intensity threshold value to distinguish one or more highlighted pixels within the first frame using a mean value and a standard deviation value of the plurality of minimum intensity values;

determine an offset value based on the intensity threshold value, the offset value being used to indicate one or more pixels that need to be modified to suppress a reflection within the first frame;

determine a specular component of each pixel within the first frame by subtracting the offset value from the intensity threshold value for each pixel outside of the bounding box; and subtract the specular component from each respective pixel outside of the first updated bounding box for the second frame of the plurality of frames.

8. The system of claim 1, wherein the memory further includes instructions, which, when executed, cause the processor to:

estimate a velocity of the object based on one or more positions of the object across the plurality of frames.

9. The system of claim 1, wherein the set of positional and attitudinal properties of the multirotor device include an attitude, a position, a velocity, and an altitude of the multirotor device relative to the landing surface.

10. The system of claim 1, wherein the landing structure is a buoyant structure.

11. The system of claim 10, wherein the buoyant structure includes a first buoyant sub-structure and a second buoyant sub-structure.

12. A method, comprising:

estimating, by a processor in communication with a memory and an image capture device, a position of an object relative to a multirotor based on a plurality of frames of a video feed captured by the image capture device by:

identifying, for a first frame of the plurality of frames, an initial largest closed contour of a plurality of closed contours identifiable within the first frame;

applying a specularity removal operation to pixels within the first frame that are outside of a bounding box associated with the initial largest closed contour;

identifying, for the first frame and following specularity removal, a first updated largest closed contour and a first updated bounding box that encloses the first updated largest closed contour, the first updated bounding box being indicative of a position of the object for the first frame;

applying, for a second frame of the plurality of frames, a specularity removal operation to pixels within the second frame that are outside of the first updated bounding box;

identifying, for the second frame and following specularity removal, a second updated largest closed contour and a second updated bounding box that encloses the second updated largest closed contour, the second updated bounding box being indicative of a position of the object for the second frame; and applying an optimal control output to each respective propeller motor of a plurality of propeller motors of the multirotor based on one or more positions of the object across the plurality of frames and a set of positional and attitudinal properties of the multirotor such that the multirotor encapsulates the object within a capture void of the multirotor upon landing on a landing surface.

13. The method of claim 12, further comprising:
applying a dynamic sliding manifold operation within a sliding mode control system based on constrained linear model predictive control that minimizes a position error between the position of the object and a position of the multirotor and minimizes a velocity error between a velocity of the object and a velocity of the multirotor and keeps the sliding mode control system within a boundary layer of the sliding mode control system.

14. The method of claim 12, further comprising:
estimating, at the processor, a velocity of the object based on one or more positions of the object across the plurality of frames.

15. The method of claim 12, further comprising:
actuating a net mechanism of the multirotor such that a net of the multirotor spans across the capture void to capture the object within the net.

* * * * *